United States Patent [19]
Sakamoto et al.

[11] Patent Number: 5,541,777
[45] Date of Patent: Jul. 30, 1996

[54] ELECTROMAGNETIC DRIVING DEVICE

[75] Inventors: Satoshi Sakamoto; Hiroshi Kawamura; Shinichi Orimo, all of Tokyo, Japan

[73] Assignee: Sony Corporation, Tokyo, Japan

[21] Appl. No.: 329,838

[22] Filed: Oct. 27, 1994

[30] Foreign Application Priority Data

Oct. 27, 1993 [JP] Japan .................................. 5-268902

[51] Int. Cl.⁶ .................................................. G02B 7/02
[52] U.S. Cl. ........................... 359/824; 359/696; 310/13
[58] Field of Search ............................... 359/823, 824, 359/198, 200, 216, 694, 696, 697, 698; 310/12, 13, 143, 145, 146, 181, 184, 185, 210

[56] References Cited

U.S. PATENT DOCUMENTS

| | | | |
|---|---|---|---|
| 4,075,521 | 2/1978 | Nordelo | 310/184 |
| 4,341,970 | 7/1982 | Auinger | 310/184 |
| 4,669,013 | 5/1987 | Scranton et al. | 310/13 |
| 4,774,428 | 9/1988 | Konecny | 310/184 |
| 4,785,210 | 11/1988 | Maruyama et al. | 359/696 |
| 5,069,515 | 12/1991 | Itami et al. | 359/200 |
| 5,078,472 | 1/1992 | Sugawara | 359/824 |
| 5,272,567 | 12/1993 | Inoue | 359/696 |

*Primary Examiner*—Loha Ben
*Attorney, Agent, or Firm*—Ronald P. Kananen

[57] ABSTRACT

According to the electromagnetic driving device of the present invention, since it has a fixed member having an outside yoke and an inside yoke, a magnet for generating the thrust being bonded on either side of the outside yoke or inside yoke, and a movable member having a driven holding body portion for holding a body to be driven, and a coil wound in more than two phases in an axial direction between said outside yoke and inside yoke, and is movable in an axial direction with respect to the fixed member, in which a body to be detected is provided in said movable member, and a position-detecting element is provided in the fixed member which detects the magnetic field of said magnet and detects the position of the movable member to generate a position-detecting signal for controlling the current supply to the coil, any restrictions of the moving range and any decrease in the moving speed due to wiring and the like of the movable member are not caused, and smooth movements according to the current supply to the coil can be provided, with respect to the position detection of the movable member.

17 Claims, 14 Drawing Sheets

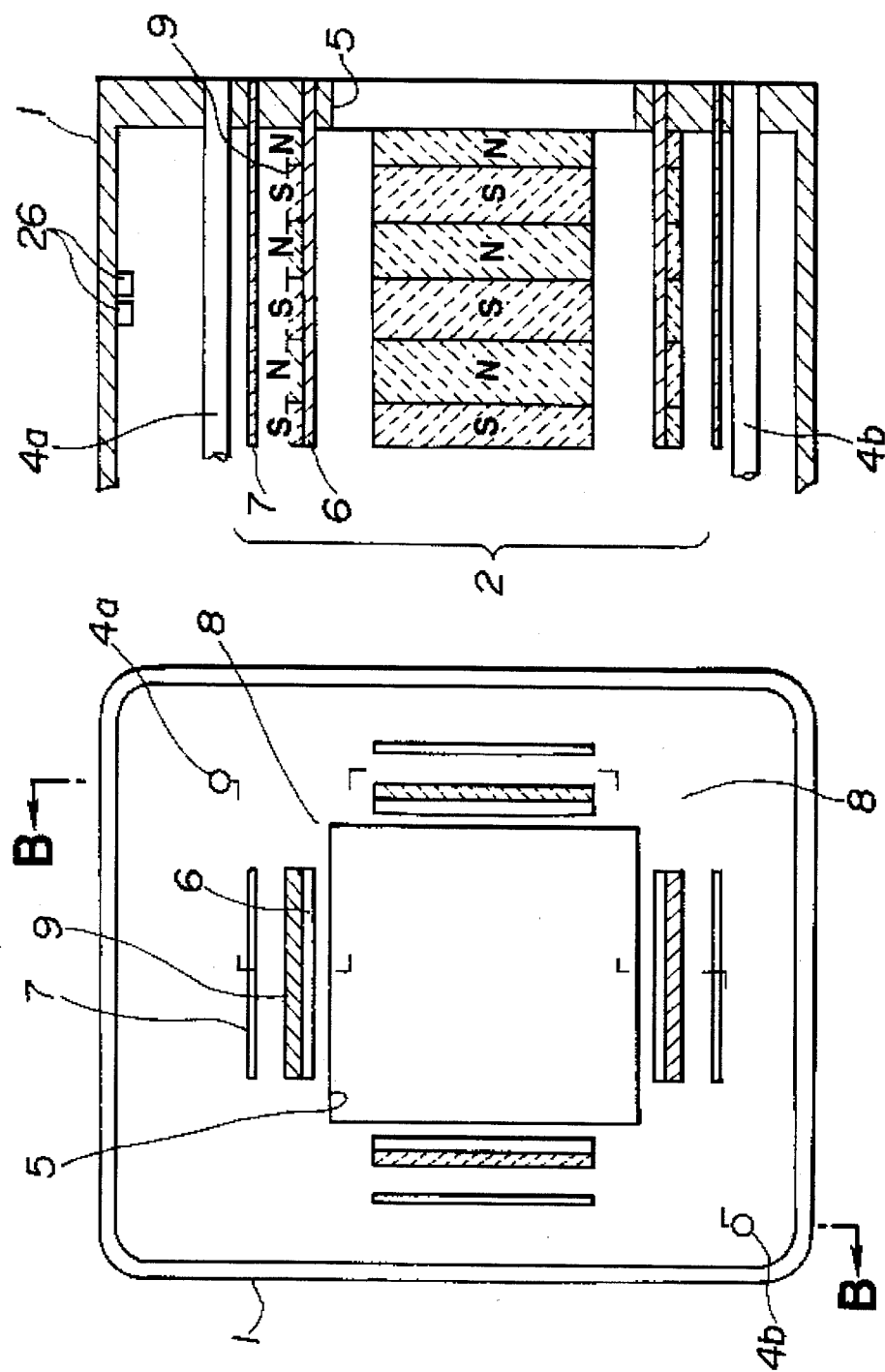

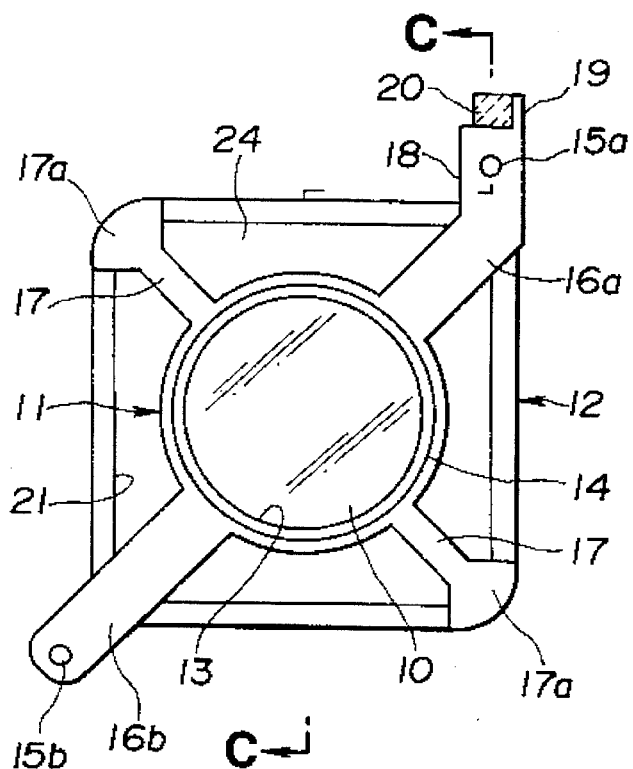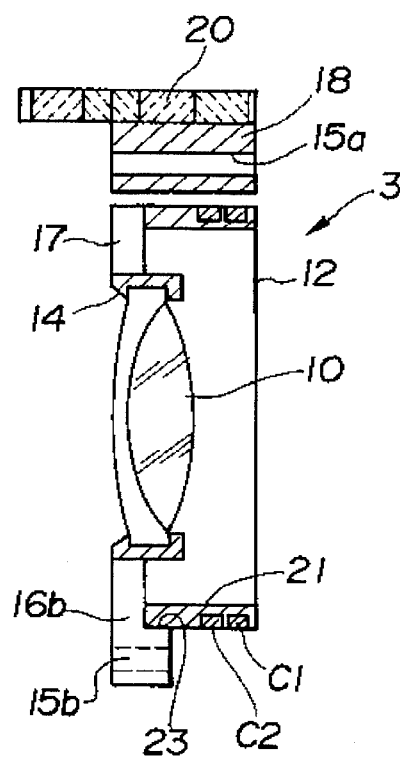
FIG.3(a)    FIG.3(b)

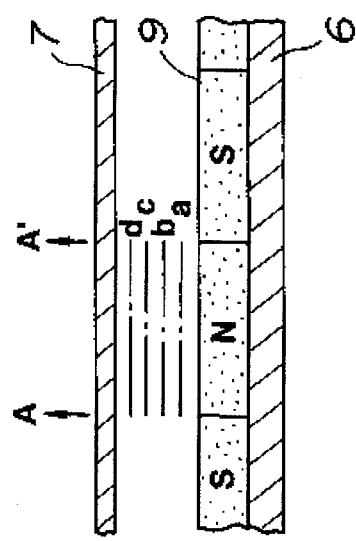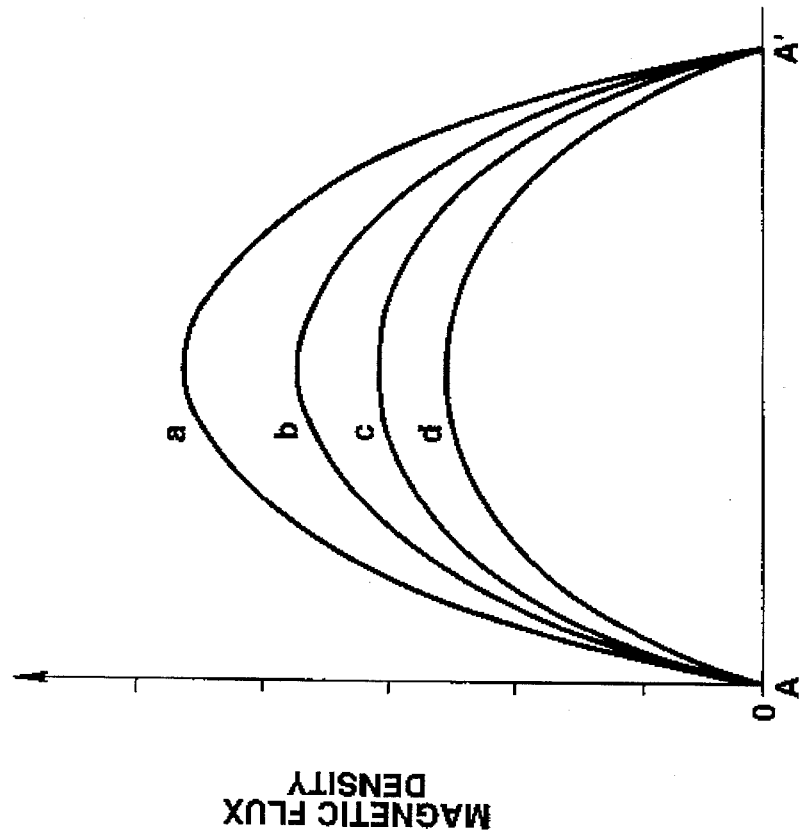
FIG.9

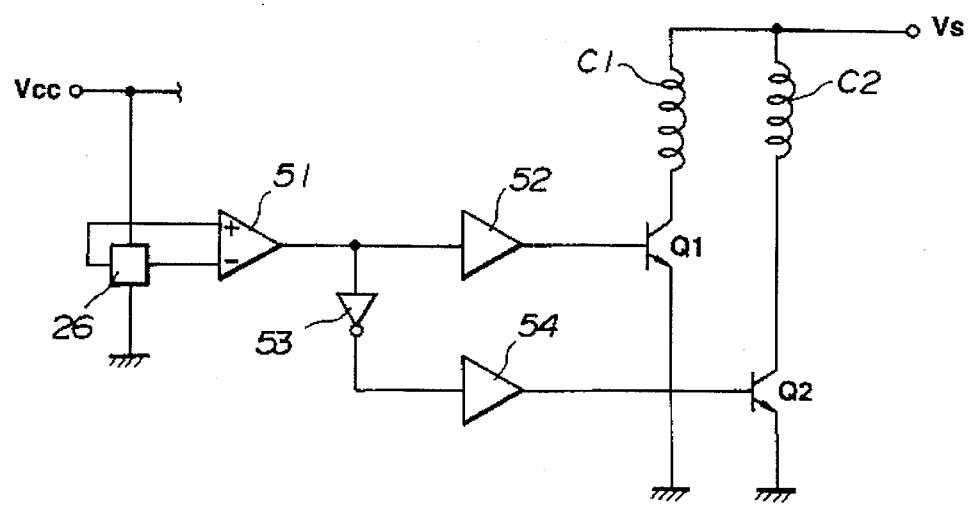
FIG.11
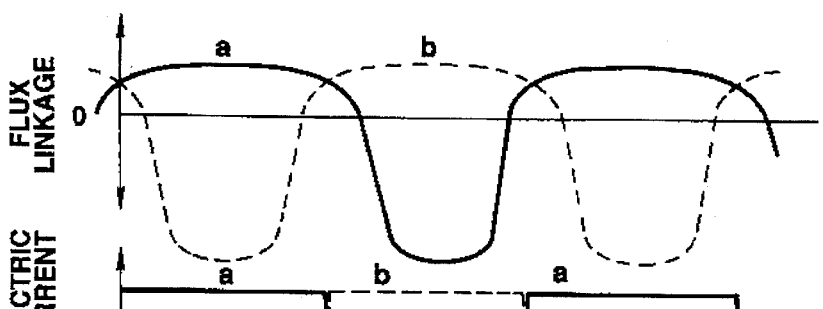
FIG.12(a)
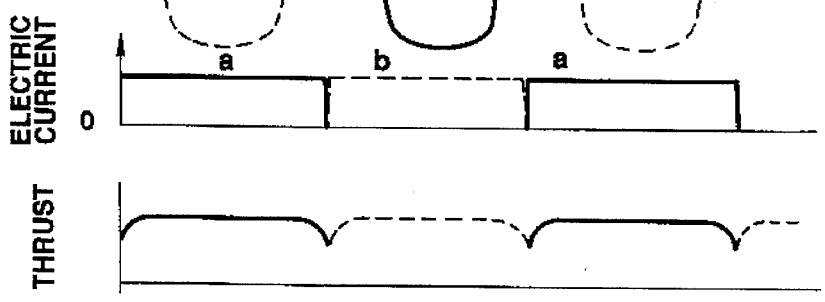
FIG.12(b)
FIG.12(c)

ELECTROMAGNETIC DRIVING DEVICE

BACKGROUND OF THE INVENTION

1. Field of the Invention

The present invention relates to an electromagnetic driving device in which a movable member having a body to be driven with respect to a side body is provided slidably in an axial direction. More specifically, the invention relates to an electromagnetic driving device suitable for being used for a driving mechanism which drives a movable lens for focusing and a movable lens for zooming in a lens mirror cylinder mounted in a video camera and the like.

2. Description of the Prior Art

In a lens mirror cylinder of a video camera and the like which has an autofocus function and an electric zoom function, in general, there is provided a driving means for moving a movable lens for focusing and a movable lens for zooming in a direction of the optical axis. As a driving means of this kind, for example, an electromagnetic driving-system actuator having a coil and a magnet has been used relatively in a wide range.

The lens mirror cylinder which uses the aforementioned electromagnetic driving-system actuator is composed of an inner-focus unit which comprises a front ball unit, a variator forming a zoom unit, a diaphragm device, a fixed lens and a movable lens group, provided in the outer housing in order from the front of the camera.

The aforementioned variator is to determine the Wide end and the Tele end of the camera lens system, and the moving range thereof is wide. Therefore, as a driving mechanism of this variator, there can be used mainly a stepping motor, and a rotation-linear movement conversion mechanism which converts a rotation movement to a linear movement of the stepping motor.

The movable lens of the inner-focus unit is a lens which moves to image a subject on a face of a camera tube of, for example, a CCD solid-state image sensing device settled at the back of the lens mirror cylinder, and the moving range thereof is narrower than that of said variator.

Therefore, as a driving mechanism for moving the movable lens in the inner-focus unit, there can be used an electromagnetic driving device such as a voice coil motor which is suitable for moving in a narrow range.

Conventional electromagnetic driving device is composed of, as shown in FIG. 16, a fixed member 102 which is housed and fixed in the outer housing 101, and a movable member 103 which is slidably movable in an axial direction to the fixed member 102, and two axes 104a and 104b are arranged along the optical axis in the inside of said outer housing 101. Furthermore, the fixed member 102 is composed of a yoke frame 105 and a magnet 106 fixed to this yoke frame 105.

Concretely, said yoke frame body 105 is arranged backward and composed of a rectangular connecting board 108 in which a rectangular hole 107 is formed in the central thereof, four outer frame yokes 109 formed on all sides of the end faces of this connecting board 108 toward the forward direction of the axis, and an inner frame yoke 110 in an angular tube-like shape which stands up from the periphery of the hole of said connecting board 108 to forward direction in the axial direction, which are integrally connected. A magnet 106 is bonded to the inner face of the outer frame yoke 109, respectively, with an adhesive and the like, and is singly magnetized so that the magnetic pole differs in the direction of from the outer frame yoke 109 toward the inner frame yoke 110.

The movable member 103 is composed of a plastic frame body 112 in which a focus lens 111 is attached and a bobbin 113 bonded to the back face of the frame body 112.

In the plastic frame body 112, the outer shape is formed in a rectangular form, and a frame body 114 in which a hole having the same diameter with that of the focus lens 111 is provided in the central part thereof, a cylindrical lens-holding cylinder 115 which projects from the periphery of the hole of this frame body 114 forward to fix and hold said focus lens 111, and bearing portions 117a and 117b projected outward from the side face of this lens-holding cylinder 115 having insertion holes 116a and 116b provided therein, through which the axes 4a and 4b of the outer housing 101 are inserted, in the vicinity of the end portion thereof are integrally formed therein.

The bobbin 113 is formed in an angular tube-like shape by a synthetic resin, and has a hollow portion (not shown) in the central portion thereof, whose cross section is a rectangular shape. In the bobbin 113, there is formed a winding groove in the backward portion of the side face, and a coil 118 is wound to the winding groove in an axial direction. In the bobbin 113, the size of the hollow portion is formed to be larger than that of the outer shape of the inner yoke 110 in said fixed member 102, and the size of the outer shape thereof is formed to be smaller than that of a rectangle formed by a line which connects the end face of four magnets bonded to the outer frame yoke 109, thereby it can be housed in the space formed in the opposite faces of the inner frame yoke 110 of said fixed member 102 and the four magnets 106 bonded to the outer frame yoke 109.

When the bobbin 113 in said movable member 103 is housed in said space, the coil 118 wound to the bobbin 113 is located between the inner frame yoke 110 and the magnet 106. At this time, a closed magnetic circuit which is a flux path through which the magnetic flux from the magnet passes, that is, a closed magnetic circuit in which said magnetic flux passes through magnet 106—inner frame yoke 110—connecting board 108—outer frame yoke 109—magnet 106 is formed by the magnet 106 and the yoke frame body 105, and the coil 118 of the bobbin 113 is arranged on such a closed magnetic circuit.

Accordingly, when a drive current is supplied to the coil 118, a magnetic flux is caused in the direction corresponding to the direction of the drive current, thereby a moving force forward or backward is given to the coil 118, and by this moving force, the movable member 103 is moved to the fixed member 102.

In said conventional electromagnetic driving device, a body to be detected, such as a magnet, is generally bonded to the fixed member 102 and a sensor for detecting, for example magnetically, said body to be detected is provided on the movable member 103, in order to detect the relative position of the movable member 103.

In this case, it is required to wire to the sensor provided on the movable member 103, however, since the movable member 103 moves regularly toward the fixed member 102, there are caused such problems that the moving range is restricted by the wiring, or that the moving speed is decreased by the load imposed on the wiring.

Furthermore, since the magnet 106 is singly magnetized so that the magnetic pole differs in the direction of from the outer frame yoke 109 toward the inner frame yoke 110, the magnetic flux of the closed magnetic circuit formed with the inner frame yoke 110, the outer frame yoke 109 and the magnet 106 is concentrated on one or two spots. Thereby, the yoke thickness of the yoke frame body 105 has to be increased in proportion to the movable distance of the movable member 103, and the moving distance of the movable member 103 is increased. Therefore, there is a problem in that when it is a long stroke, the weight of the yoke frame body 105 increases, and the electromagnetic driving device becomes heavy.

Furthermore, in the conventional electromagnetic driving device, a plastic frame body 112 which holds the focus lens 111 closes the front of the bobbin 113 having a hollow portion, and the inner frame yoke 110 of the fixed member 102 is also formed in an angular tube-like shape, thereby the maximum moving range of this movable member 103 is prescribed by the length in the axial direction of the hollow portion of the bobbin 113, particularly, by the length in the axial direction excluding the length of the width of the winding groove.

Therefore, in order to make the movable member 103 slidable against the fixed member 102, that is, to make the focusing possible by an electromagnetic driving system, it is required to make the length in the axial direction of the bobbin 113 large, and to provide a relief h equivalent to the moving distance in addition to said winding groove. In this case, the length which puts together the fixed member 102 and the movable member 103, especially when the movable member 103 is moved forward, becomes the length which adds up the length of the lens-holding cylinder 115 which holds the focus lens 111, the length of the bobbin 113, and the length of the fixed member 102, thereby the length thereof becomes very large. Therefore, in the conventional electromagnetic driving device, there is a problem in that the length in the axial direction of the lens mirror cylinder becomes large to make the overall size of the camera large.

Furthermore, due to the above structure, the end face of the inner frame yoke 110 and the end face of the outer frame yoke 109 in the fixed member 102 has to be open, thereby the magnetic combination of the inner frame yoke 110 and the outer frame yoke 109 becomes one way only. Therefore, in order to improve the magnetic efficiency, the thickness of the inner frame yoke 110 and the outer frame yoke 109 must be increased, thereby there is a problem in that the weight of the electromagnetic driving device, and the weight of the whole camera becomes large.

The above problem becomes more conspicuous with the increase of the moving distance of the movable member 103, and the improvement of these problems has been desired.

SUMMARY OF THE INVENTION

The present invention has been completed under this background. It is therefore a primary object of the present invention to provide an electromagnetic driving device which can make a smooth movement according to the current supply to the coil, without causing any restriction in the moving range and any decrease in a moving speed due to the wiring to the movable member and the like, with regard to the position detection of the movable member.

Another object of the present invention is to prevent the magnetic flux from the magnet for generating the thrust from being centralized to one or two points and to make it possible to apply the magnetic flux from said magnet to the whole coil of more than two phases, thereby to make the movement of the movable member efficient and make the yoke thickness thin and to provide an electromagnetic driving device which can realize lightening of the device per se.

Still another object of the present invention is to provide an electromagnetic driving device which can make the thrust applied to the movable member substantially uniform in the whole moving range, and can easily control the position control of the movable member.

Another object of the present invention is to provide an electromagnetic driving device which can move the movable member in a state that the body to be driven is housed in the fixed member, and can reduce the length of the device per se substantially up to the length of the fixed member to design the down-sizing of the device per se.

BRIEF DESCRIPTION OF THE DRAWINGS

FIG. 2, comprised of FIGS. 2(a) and 2(b), illustrates dihedral views showing the fixed member of the focus control device with the outer housing, and FIG. 2(a) is an elevational view seen from the front and FIG. 2(b) is a sectional view along the line B—B of FIG. 2(a).

FIG. 3, comprised of FIGS. 3(a) and 3(b), illustrates dihedral views showing the movable member of the focus control device, and FIG. 3 (a) is an elevational view seen from the front and FIG. 3(b) is a sectional view along the line C—C of FIG. 3(a).

FIG. 9 is a characteristic curve showing the change of the density toward the outside yoke in the magnetic flux from the N pole of the magnet for generating the thrust bonded to the inside yoke.

FIG. 11 is a circuit diagram showing the structure of the driving circuit assembled in the focus control device according to the second example.

FIG. 12, comprised of FIGS. 12(a) to 12(c) is a characteristic curve showing the change in the density of the flux linkage applied to the A-phase coil and the B-phase coil, the drive current supplied to the A-phase coil and the B-phase coil, and the thrust applied to the movable member, when the movable member moves forward in the focus control device according to the second example.

DESCRIPTION OF THE PREFERRED EMBODIMENTS

Figure 1B:
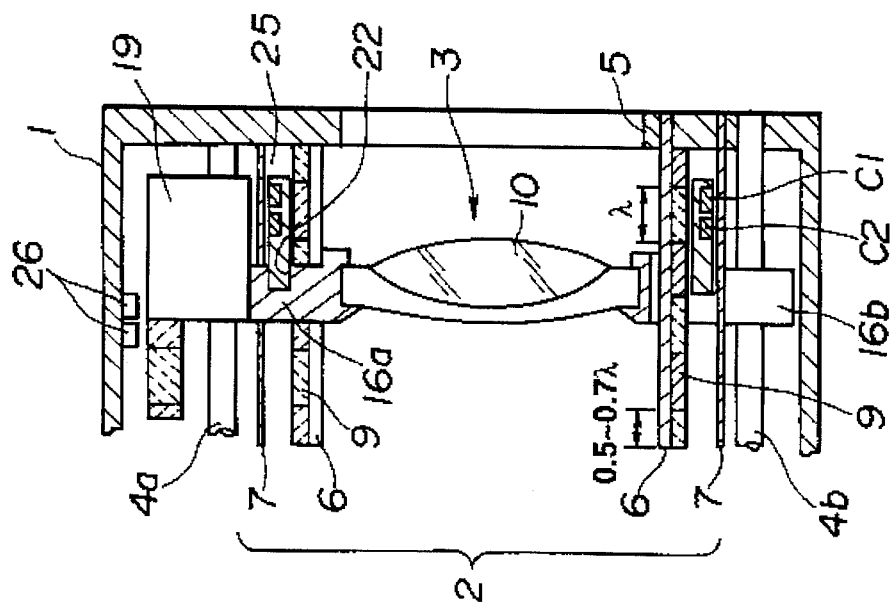
FIG. 1(b) is a sectional view along the line A—A of FIG. 1(a).

The electromagnetic driving device according to the present invention has a fixed member having an outside yoke and the inside yoke, a magnet for generating the thrust being fixed on either side of the outside yoke or the inside yoke, and a movable member which has a driven holding body portion for holding a body to be driven, and a coil wound in at least two phases in the axial direction between the outside yoke and the inside yoke, and is movable in an axial direction with respect to the fixed member. And a body to be detected 20 is provided in the movable member, and a position-detecting means which detects the body to be detected for detecting the position of the movable member 3 to generate a position-detecting signal for controlling the current supply to the coil is provided in the fixed member 2.

In this case, said magnet for generating the thrust may be multipolarly magnetized, and the magnetized width of the end portion may be in the length of 0.5 to 0.7 times as long as that of the magnetized width in the central portion. Furthermore, said body to be detected may be a magnet which is multipolarly magnetized with an equivalent interval, and said position-detecting means may be a Hall element provided opposite to the magnet which constitutes said body to be detected.

Furthermore, the positional relations between said magnet for generating the thrust, coil and Hall element may be constituted in the following manner.

Namely, when the magnetized width other than the end portions of said magnet for generating the thrust is assumed to be $\lambda$, the alienated width of the center in the winding direction of each phase in said coil wound in two phases is assumed to be $\lambda/2+n\lambda$ i (n is an integer), and the alienated width of two Hall elements which constitutes said position-detecting means is assumed to be $\lambda/2+n\lambda$ (n is an integer). When the center of the winding direction in one phase of the coil is located in the magnetized boundary of the magnet for generating the thrust, one Hall element of these two Hall elements is provided in a position located in the magnetized boundary of the magnet which constitutes the body to be detected.

Or, when the magnetized width $\lambda A$ of one side other than the end portion in the magnet for generating the thrust is made different from the magnetized width $\lambda B$ of the other side, and the average of the magnetized width $\lambda A$ of the one side and the magnetized width $\lambda B$ of the other side is assumed to be $\lambda$, the alienated width of the center in the winding direction of each phase in said coil wound in two phases is assumed to be $n\lambda$ (n is an integer), and the center in the winding direction of one phase of the coil is located in the position alienated by $\lambda/2$ from the magnetization center of the magnet for generating the thrust, the Hall element is provided in a position located in the magnetized boundary of the magnet which constitutes the body to be detected.

Or, when the magnetized width other than the end portions of the magnet for generating the thrust is assumed to be $\lambda$, the alienated width of the center in the winding direction of each phase in the coil wound in three phases is assumed to be $2\lambda/3+n\lambda$ (n is an integer), and the alienated width of three Hall elements which constitute the position-detecting means is assumed to be $2\lambda/3+n\lambda$ (n is an integer).

Furthermore, the fixed member may be fixed to the outer housing 1 having an axis provided therein, and a bearing portion through which the axis is penetrated may be provided. In this case, it is so constituted that the bearing portion is provided in the movable member so that it projects outward than the outside yoke in the fixed member, a notch is formed in a position corresponding to at least the bearing portion of the outside yoke and the inside yoke, and the projecting portion of the inside yoke is formed in the forward portion of the movable member.

In this case, the body to be driven may be a lens, and the body to be driven-holding portion may be a lens holder for holding a lens.

In the electromagnetic driving device according to the present invention, the coil wound in more than two phases in the movable member is located between the outside yoke and the inside yoke. Namely, between the inside yoke and the outside yoke, a closed magnetic circuit by the magnet is formed, and the coil is located on this closed magnetic circuit. Therefore, when the drive current is supplied to the coil, a magnetic flux to the direction in response to the direction of the drive current is generated from the coil, thereby a moving force forward or backward is given to the coil, and by this moving force, the movable member is moved toward the fixed member.

And in the electromagnetic driving device, since a body to be detected is provided in the movable member, and a position-detecting means for generating a position-detecting signal to detect the body to be detected for detecting the position of the movable member and to control the current supply to the coil is provided in the fixed member, the electric wiring can be made to the position-detecting means provided in the fixed member, and it is not required to make these wiring to the movable member. Thereby, in relation to the position detection of the movable member, any restriction of the moving range or any decrease in the moving speed are not caused due to the wiring and the like to the movable member, and a smooth movement can be provided according to the current supply to the coil.

Furthermore, a magnet for generating the thrust is multipolarly magnetized, and when the magnetized width of the end portions thereof is 0.5 to 0.7 times as long as the magnetized width of the central portion, the thrust applied to the movable member becomes substantially uniform in the whole moving range. Particularly, when it is 0.7 times, the uniformity characteristic becomes conspicuous. When the thrust becomes uniform in the whole moving range, an abrupt decrease or increase in the moving speed of the movable member is not caused, and the movement of the movable member becomes quite smooth. As a result, position control for the movable member can be easily done.

Furthermore, particularly, since the magnet for generating the thrust is multipolarly magnetized, it can be prevented to centralize the magnetic flux from the magnet for generating the thrust on one or two spots, and the magnetic flux from said magnet can be applied to the whole coil of more than two phases. As a result, even if the yoke thickness of the inside yoke and the outside yoke is made thin, the movable member can be efficiently moved, and lightening of the electromagnetic driving device per se can be realized.

Furthermore, the fixed member may be fixed to the outer housing having an axis provided therein, and a bearing portion through which the axis is penetrated may be provided. In this case, it is so constituted that the bearing portion is provided in the movable member so that it projects outward than the outside yoke in the fixed member, a notch is formed in a position corresponding to at least the bearing portion of the outside yoke and the inside yoke, and in the case where the penetrating portion of the inside yoke is formed in the forward portion of the movable member, when the movable member is assembled to the fixed member, the bearing portion is inserted into the outer housing while an axis extending from the outer housing is penetrated through the bearing portion.

At this time, the bearing portion of the movable member enters into the notch provided in the inside yoke and the outside yoke of the fixed member, and the inside yoke is penetrated through the penetrating portion formed on the forward portion of the movable member. As a result, the body to be driven of the movable member is housed in the fixed member.

Accordingly, the body to be driven moves in the fixed member with the movement of the movable member, and the moving range thereof is at least the distance that a length in the axial direction of the bobbin is deducted from the length in the axial direction of the fixed member. Therefore, it is not required to provide a relief to the bobbin equivalent to the moving distance. As a result, it becomes possible to reduce the length of the device itself substantially up to the length of the fixed member, and to design the down-sizing of the electromagnetic driving device itself.

EXAMPLES

The invention will now be described in detail by way of examples in which the electromagnetic driving device according to the present invention is applied to the focus control device of a movable lens (focus lens) of the inner focus unit mounted in the lens mirror cylinder of a video camera and the like with reference to the accompanying drawings of FIG. 1 to FIG. 15.

Figure 1A:
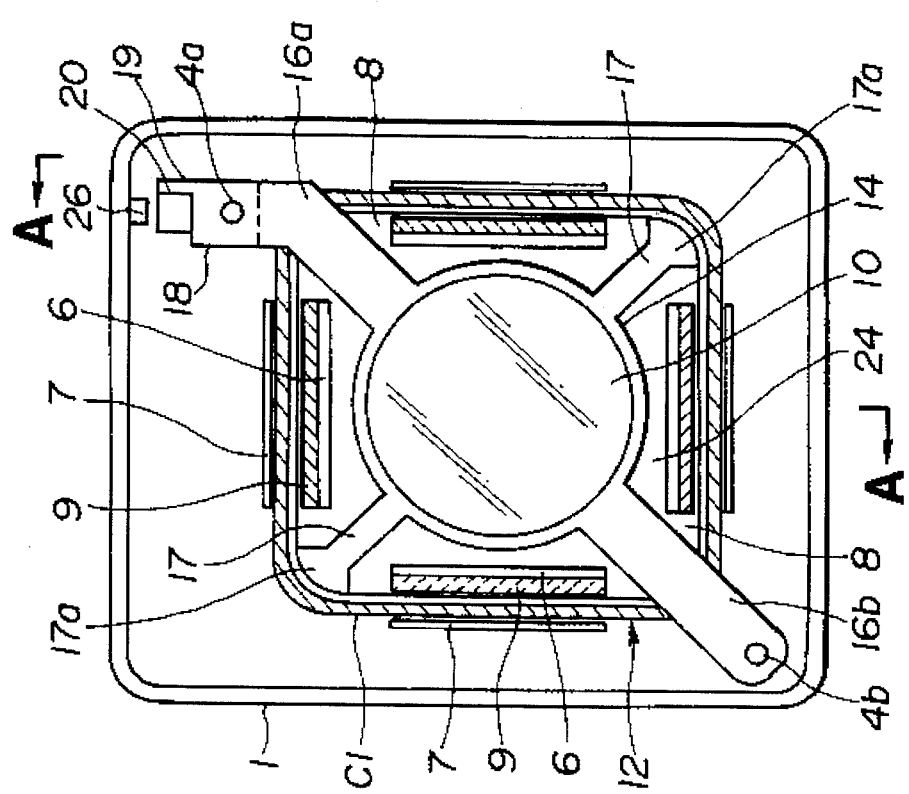
FIG. 1, comprised of FIGS. 1(a) and 1(b), illustrates dihedral views showing the assembled condition of examples in which an electromagnetic driving device according to the present invention is applied for the focus control device of a movable lens (a focus lens) of the inner focus unit mounted in the lens mirror cylinder, such as a video camera and the like, and FIG. 1(a) is an elevational view seen from the front side.

The whole structure of the focus control device according to these examples is composed of a fixed member 2 housed and fixed in the outer housing 1, and a movable member 3 which is movable in the axial direction with respect to the fixed member 2, as shown in FIGS. 1 and 2, and in said outer housing 1, two axes 4a and 4b having a substantially circular section are provided along the optical axis. Also in the central portion of the backward end face of the outer housing, a rectangular hole 5 is formed.

The fixed member 2 is, as shown in FIG. 2, constituted so that four pairs of metallic yokes are respectively planted in the inner wall of the back end of the outer housing 1. Namely, in the illustrated example, yokes of each pair correspond to each side of the rectangular hole 5 formed on the back end face of the outer housing 1, and yokes of each pair are planted in parallel to each side of said hole 5, and among yokes of each pair, one yoke 6 is provided in close proximity to the hole 5, and the other yoke 7 is provided so that the plate faces of said one yoke 6 and the other yoke 7 are in parallel. Therefore, in the description hereinafter, the yoke 6 in close proximity to the hole 5 is referred to as an inside yoke, and the outside yoke 7 is referred to as an outside yoke. Because of such a structure, said fixed member 2 has a shape in which a notch 8 is formed respectively between the adjacent inside yokes 6 and between the adjacent outside yokes 7.

And among these inside yokes and outside yokes, on the side face of the inside yoke 6 facing to the outside yoke, a magnet 9 for generating the thrust is bonded by, for example, an adhesive and the like. Furthermore, the magnet 9 has different magnetic poles in the direction from the inside yoke 6 toward the outside yoke 7, respectively, and is multipolarly magnetized so that the magnetic pole differs alternately along the axial direction.

Particularly in this example, the magnetized width of the both ends of said magnet 9 is set to the length of 0.5 to 0.7 times as long as the magnetized width $\lambda$ of the central portion. The action by the difference of this magnetized width will be described later.

The movable member 3 is, as shown in FIG. 3, composed of a lens holder 11 having a focus lens 10 mounted in the center thereof and a bobbin 12 bonded to the back face of the lens holder 11.

The lens holder 11 is formed by a metal or a synthetic resin, and is so constituted that there are integrally formed a circular frame body 14 having a lens-mounting hole 13 in the center to which a focus lens 10 is fitted and fixed, the first and the second bearing plates 16a and 16b having penetrating holes 15a and 15b formed therein in the vicinity of the ends respectively, through which the corresponding axes 4a and 4b of the outer housing penetrate, which project from the frame body 14 along the frame body face in the direction of 45 degree mutually to the plumb line, and a pair of reinforcing plates 17 which project from this frame body 14 along the frame body face in the direction of 90 degree mutually against the extending direction of said first and second bearing plates 16a and 16b. The pair of reinforcing plates 17 are formed so that each tip is fan-shaped to constitute the mounting portion 17a of the bobbin 12.

In the upper portion of the first bearing plate 16a, a magnet-mounting portion 18 extending backward is integrally formed. This magnet-mounting portion 18 is formed in substantially an angular tube-like shape, and on one side of the upper face thereof, a position-determining plate 19 is integrally formed. And a magnet 20 for detecting the position in a prismatic shape is bonded so as to come into contact with the upper face of the magnet-mounting portion 18 and the inner face of the position-determining plate 19 with, for example, an adhesive and the like. This magnet 20 for detecting the position is a multipolar magnetization-type magnet, and is multipolarly magnetized so that the magnetic pole differs alternately with the same intervals along the lengthwise direction.

On the other hand, the bobbin 12 is formed by a synthetic resin in an angular tube-like shape having a hollow portion 21 in the axial direction. In this bobbin 12, two winding grooves are formed in the backward portion of the side face, and coils of two phases (A-phase coil C1 and B-phase coil C2) are wound to this winding groove respectively in the axial direction.

In said first bearing plate 16a in said lens holder 11, a L-shaped groove 22 (see FIG. 1) is formed on the backface side thereof, and in the second bearing plate 16b, a difference in level 23 having an L-shaped end face is formed on the backface side thereof. The width of said groove 22 is made to be equal to the thickness of the bobbin 12, and the outside end face of said groove 22 and the end face of said difference in level 23 are set so as to correspond to the outside face of the corner portion of the bobbin 12.

Therefore, when the bobbin 12 is firmly fixed to the lens holder 14, the corner portion corresponding to the first bearing plate 16a of the front portions of the bobbin 12 is inserted into the groove 22 formed in the first bearing plate 16a. At this time, the outer face of the other corner portion of the bobbin 12 is located on the end face of the difference in level 23 formed in the second bearing plate 16b. Furthermore, at this time, each end face of the corner portion of the front portion of the bobbin 12, corresponding to the bobbin-attaching portion 17a of the pair of the reinforcing plate 17 in the lens holder 11 abuts against the backward end face of the bobbin-attaching portion 17a. And the bobbin 12 is firmly fixed to the backward face of the lens holder 11 by bonding each contact face with an adhesive and the like. At this time, in the forward portion of the movable member 3, four penetrating portions 24 are formed, making the frame body 14 of the lens holder 11 as a center.

Furthermore, the size of the hollow portion 21 of the bobbin 12 is formed to be larger than that of the rectangle formed by aline connecting the end faces of each magnet 9 bonded to the four inside yokes 6 of said fixed member 2. And, the external form thereof is formed to be smaller than the size of the rectangle formed by a line connecting the inner end faces of the four outside yokes 7. Thereby, as shown in FIG. 1, the bobbin 12 can be housed in an axial direction without contact in the space 25 formed between the opposite faces of the four magnets 9 bonded to the inside yokes 6 and the outside yokes 7 of said fixed member 2.

And, when the bobbin 12 in said movable member 3 is housed in said space 25, the A-phase coil C1 and the B-phase coil C2 wound to the bobbin 12 are located between the outside yoke 7 and the magnet 9. At this time, a closed magnetic circuit is formed in which the magnetic flux coming from the magnet 9 passes through the portion where the face opposite to the coils C1 and C2 in the magnet 9 is N pole—the outer yoke 7—the portion where the face opposite to the coils C1 and C2 in the magnet 9 is S pole, and the A-phase coil C1 and the B-phase coil C2 wound to the bobbin 12 are arranged on such a closed magnetic circuit.

Accordingly, when the drive current is supplied to the A-phase coil. C1 and the B-phase coil C2, the magnetic flux is generated from the coils C1 and C2 of each phase in the direction in response to the direction of the drive current, thereby a moving force forward or backward is given to the A-phase coil C1 and the B-phase coil C2 to move the movable member 3 to and from the fixed member 2.

Furthermore, in the inner face of the outer housing 1, a Hall element 26 is attached in the position opposite to the magnet 20 for detecting the position fixed to the magnet-attaching portion 18 of the first bearing plate 16a in said movable member 3. Therefore, when the magnet 20 for detecting the position moves with the movement of the movable member 3, the flux density affecting the Hall element 26 changes to change the Hall voltage, and by counting this voltage change, the current position of the movable member 3 can be detected.

Now, the focus control device according to the first example will be described with reference to FIGS. 4 to 9. The same reference numerals will be used for those corresponding to FIG. 1.

Figure 4:
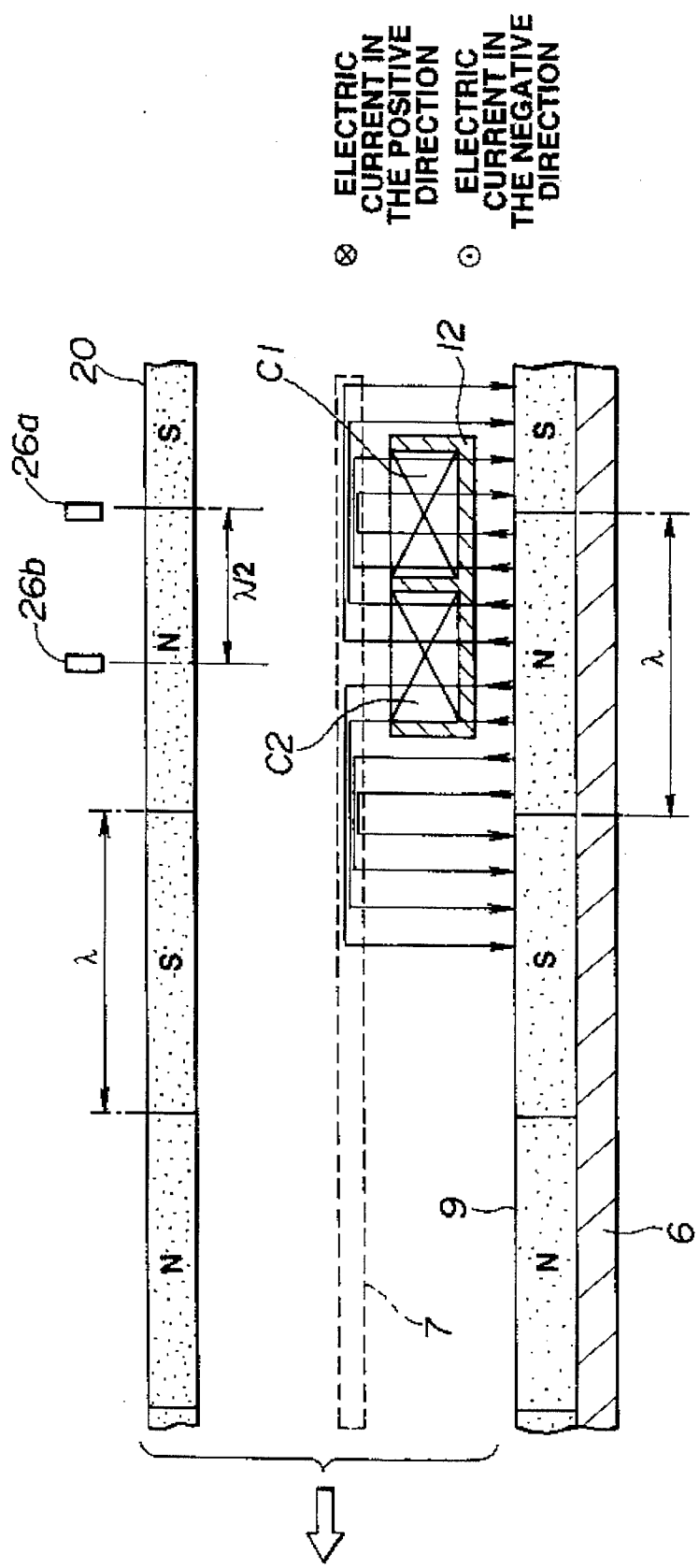
FIG. 4 is a view illustrating the structure of the main part of the focus control device according to the first example.

The focus control device according to the first example is so constituted, as shown in FIG. 4, that the coils of two phases, that is, the A-phase coil C1 and the B-phase coil C2 are wound to the bobbin 12, and when the magnetized width other than the end portion of the magnet 9 is assumed to be λ, the alienated width of the center in the winding direction of each phase in A-phase coil C1 and B-phase coil C2 is set to be λ/2, and the magnetized width other than the end portions of the magnet 20 for detecting the position is also set to be λ.

Furthermore, in the first example, two Hall elements 26a and 26b are provided in the inner wall of the outer housing 1, opposite to said magnet 20 for detecting the position. Here, the Hall element 26a located in the position close to the back end face side of the outer housing 1 is referred to as the first Hall element, and the other Hall element 26b is referred to as the second Hall element. The alienated width of these first and second Hall elements 26a and 26b is set to be λ/2, and the first Hall element 26a among these two Hall elements 26a and 26b is provided in a position located in the magnetized boundary of the magnet 20 for detecting the position, when the center in the winding direction of the A-phase coil C1 is located in the magnetized boundary of the magnet 9.

Furthermore, the relation between the coils C1 and C2 of each phase and the magnetized direction of the magnet 20 for detecting the position is such that the center in the winding direction of the A-phase coil C1 and the magnetized boundary coincides substantially, and the center in the winding direction of the B-phase coil C 2 and the center in the lengthwise direction of N pole coincides substantially.

And, when the positive magnetic field is applied to the first Hall element 26a by opposing the first Hall element 26a to N pole of the magnet for detecting the position, the drive current is connected between the first Hall element 26a and the A-phase coil C1 so that the drive current in the positive direction (the direction toward the inner part in the paper) flows to the A-phase coil C1. Also, when the positive magnetic field is applied to the second Hall element 26b by opposing the second Hall element 26b to N pole of the magnet 20 for detecting the position, the drive current is connected between the second Hall element 26b and the B-phase coil C2 so that the drive current in the negative direction (the direction toward this side in the paper) flows to the B-phase coil C2.

Now, one example of said drive current will be described with reference to FIG. 5. This drive current is composed of the first drive circuit 31a corresponding to the first Hall element 26a and the second drive circuit 31b corresponding to the second Hall element 26b. These first and second drive circuits 31a and 31b have the same circuit structure, therefore, the first drive circuit 31a will be picked up for the explanation on behalf of both of them.

In the first drive circuit 31a, a differential amplifier 32 to which the Hall voltage of the first Hall element 26a is applied and a comparator 33 which compares the output from this differential amplifier 32 with the reference voltage are connected to the first stage, and to the poststage are connected various logic circuits for selectively changing over the switching transistor of the final stage based on the output from the differential amplifier 32 and the comparison results of the comparator 33. To the switching transistor of the final stage is connected the A-phase coil C1 to change the current direction to the A-phase coil C1 by selectively changing over the switching transistor.

Said first drive circuit 31a will be described concretely. When the first Hall element 26a opposes S pole of the magnet 20 for detecting the position, and the negative magnetic field is applied to the first Hall element 26a, the minus input terminal of the differential amplifier 32 becomes high level, and a low-level signal (logically "0") will be output from the differential amplifier 32. On the contrary, when the first Hall element 26a opposes N pole of the magnet 20 for detecting the position, and the positive magnetic field is applied to the first Hall element 26a, the plus input terminal of the differential amplifier 32 becomes high level, and a high-level signal (logically "1") will be output from the differential amplifier 32.

The output signal from said differential amplifier 32 is supplied to the minus input terminal of the comparator 33 to be compared with the reference voltage applied to the plus input terminal. When the output from the differential amplifier 32 is a low-level signal, since the level of the reference voltage is higher than the output thereof, a high-level signal (logically "1") is output from this comparator 33, and on the contrary, when the output from the differential amplifier 32 is a high-level signal, since the level of the reference voltage is lower than the output thereof, a low-level signal (logically "0") is output from this comparator 33.

Next, in the logic circuit, the first and the second switching circuits 34a and 34b which select the movement in the positive direction and the movement in the reverse direction are connected to the input stage thereof. The first switching circuit 34a has two fixed contacts a1 and a2, and one movable contact 35a, and it is connected with wiring so that the one fixed contact a1 is directly supplied with the output signal from the differential amplifier 32 and the other fixed contact a2 is supplied with the output signal from the differential amplifier 32 via an inverter 36. The second switching circuit 34b has, as in the first switching circuit 34a, two fixed contacts b1 and b2, and one movable contact 35b, and it is connected with wiring so that the one fixed contact b1 is directly supplied with the output signal from the comparator 33 and the other fixed contact b2 is supplied with the output signal from the comparator 33 via an inverter 36b.

The switches S1 and S2 connected to each switching circuit 34a and 34b and the movable contacts 35a and 35b operate based on the control signal Sc from a not-shown counter. Namely, said counter counts the output signal from the differential amplifier 32, for example, the number of times of the input of a high-level signal wave form, and when it counts a predetermined number, the carrier signal is input as a control signal Sc for each switch S1 and S2.

Concretely speaking, the bobbin 12 moves from a position closest to the inner wall of the back end face of the outer housing 1 in the positive direction (forward) based on the supply of the drive current to the A-phase coil C1 and the B-phase coil C2, thereby the wave form of the high-level signal is output by the number of N pole magnetization of the face opposite to the Hall element 26a of the magnet 20 for detecting the position. Therefore, when the number of the wave form of this high-level signal is counted for the predetermined number, the bobbin 12 is to be located in the most forward position. At this time, by supplying the control signal Sc from said counter to each switching circuit 34a and 34b to change each switch S1 and S2, the movable member 3 is to move toward the back end face of the outer housing 1, that is, in the reverse direction (backward).

To the poststage of said first and second switching circuits 34a and 34b are arranged two pairs of circuits in which one buffer 37 and one NOT circuit 38 are assumed to be one pair. Here, the buffer 37a and NOT circuit 38a in the first pair are referred to as the first buffer and the first NOT circuit, respectively, and the buffer 37b and NOT circuit 38b in the second pair are referred to as the second buffer and the second NOT circuit, respectively.

And, it is so connected with wiring that an output signal from the first switching circuit 34a is supplied to the first buffer 37a and the second NOT circuit 38b, and an output signal from the second switching circuit 34b is supplied to the second buffer 37b and the first NOT circuit 38a.

To the poststage of said input stage are arranged three AND circuits (the first, the second and the third AND circuits 39a, 39b and 39c). And it is so connected with wiring that each output signal from the first buffer 37a and the first NOT circuit 38a is supplied to the first AND circuit 39a, each output signal from the second buffer 37b and the second NOT circuit 38b is supplied to the second AND circuit 39b, and each output signal from the first buffer 37a and the second NOT circuit 38b is supplied to the third AND circuit 39c.

Two pairs of circuits in which one OR circuit 40 and one NOT circuit 41 are assumed to be one pair are arranged in the poststage of said the first to the third AND circuits 39a to 39c. Here, the OR circuit 40a and NOT circuit 41a in the first pair are referred to as the first buffer and the first NOT circuit, respectively, and the OR circuit 40b and NOT circuit 41b in the second pair are referred to as the second buffer and the second NOT circuit, respectively And, it is so connected with wiring that each output signal from the first and the third AND circuits 39a and 39c is supplied to the first OR circuit 40a, an output signal from the first AND circuit 39a is supplied to the third NOT circuit 41a, each output signal from the second and the third AND circuits 39b and 39c is supplied to the second OR circuit 40b, and an output signal from the second AND circuit 39b is supplied to the fourth NOT circuit 41b.

In the final stage, two pairs of circuits are arranged, in which one PNP transistor Qp and one NPN transistor Qn, which are connected in series using a collector terminal in common, are assumed to be one pair. Here, the PNP transistor Qp1 and NPN transistor Qn1 of the first pair are referred to as the first PNP transistor and the first NPN transistor, respectively, and the PNP transistor Qp2 and NPN transistor Qn2 of the second pair are referred to as the second PNP transistor and the second NPN transistor, respectively.

And, the emitter terminal of said first PNP transistor Qp1 and said second PNP transistor Qp2 is used in common, and the source voltage Vs1 is applied to the common emitter terminal. Furthermore, the emitter terminal of said first NPN transistor Qn1 and said second NPN transistor Qn2 is used in common, and the common emitter terminal is connected to the earth potential. The A-phase coil C1 is inserted in and connected to between each collector terminal.

Furthermore, between the emitter terminal of the first PNP transistor Qp1, and the common collector terminal of the first PNP transistor Qp1 and the first NPN transistor Qn1, between this common collector terminal and the emitter terminal of the first NPN transistor Qn1, between the emitter terminal of the second PNP transistor Qp2, and the common collector terminal of the second PNP transistor Qp2 and the second NPN transistor Qn2, and between this common collector terminal and the emitter terminal of the second NPN transistor Qn2, a diode D is inserted in and connected to, respectively, for removing the noise in the spike form.

And it is so connected with wiring that the output signal from the fourth NOT circuit 41b is supplied to the base of the first PNP transistor Qp1, the output signal from the first OR circuit 40a is supplied to the base of the first NPN transistor Qn1, the output signal from the third NOT circuit 41a is supplied to the base of the second PNP transistor Qp2, and the output signal from the second OR circuit 40b is supplied to the base of the second NPN transistor Qn2.

Handling of the signal of said first driving circuit 34a in the case where the movable member 3 moves forward will now be described. First, in the situation that the first Hall element 26a opposes S pole of the magnet 20 for detecting the position and the negative magnetic field is applied to the first Hall element 26a, each logical output of the differential amplifier 32 and the comparator 33 becomes "0" and "1", respectively, thereby the logical input "0" is supplied to the first AND circuit 39a respectively, the logical input "1" is supplied to the second AND circuit 39b respectively, and the logical input "0" and "1" are supplied to the third AND circuit 39c respectively. Therefore, logic "0", "0" and "1" are output respectively from the first, the second and the third AND circuits 39a, 39b and 39c.

As a result, a low-level signal (logically "0") and a high-level signal (logically "1") are supplied respectively to each base of tile first PNP transistor Qp1 and the second PNP transistor Qp2, and a low-level signal (logically "0") and a high-level signal (logically "1") are supplied respectively to each base of the first NPN transistor Qn1 and the second NPN transistor Qn2, thereby as well as the first and the second PNP transistors Qp1 and Qp2 are operated to be ON and OFF, the first and the second NPN transistors Qn1 and Qn2 are operated to be ON and OFF, and negative driving current sill flow from the common collector terminal of the first PNP transistor Qp1 and the first NPN transistor Qn1 toward the common collector terminal of the second PNP transistor Qp2 and the second NPN transistor Qn2.

Next, the direction of the driving current which flows to the A-phase coil C1 and the B-phase coil C2 according to the moving position of the magnet 20 for detecting the position with regard to said two Hall elements 26a and 26b will be described.

First, in the case where the center in the winding direction of the A-phase coil C1 opposes the magnetized boundary of the magnet 9, and the center in the winding direction of the B-phase coil C2 substantially opposes the center in the lengthwise direction of S pole of the magnet 9 (the situation shown in FIG. 4), since the first Hall element 26a is located in the magnetization boundary of the magnet 20 for detecting the position, and the second Hall element 26b is located in the center of the lengthwise direction of N pole of the magnet for detecting the position, the drive current does not flow to the A-phase coil C1 to become uncircularized condition, and the drive current flows to the B-phase oil C2 in the negative direction (in the direction to this side of the paper in FIG. 4) to become circularized condition in he negative direction. This condition is assumed to be the initial condition.

Next, in the case where the movable member 3 is moved forward by λ/2, thereby the center in the winding direction of the A-phase coil C1 opposes the center in the lengthwise direction of S pole of the magnet 9, and the center in the winding direction of the B-phase coil C2 opposes substantially the magnetized boundary of the magnet 9, since the first Hall element 26a is located in the center in the length-wise direction of S pole of the magnet 20 for detecting the position, and the second Hall element 26b is located in the magnetized boundary of the magnet 20 for detecting the position, the drive current flows to the A-phase coil C1 in the negative direction (in the direction to this side of the paper in FIG. 4) to become circularized condition in the negative direction, and the drive current does not flow to the B-phase coil C2 to become uncircularized condition.

In the case where the movable member 3 moves forward by λ from said initial condition, thereby the center in the winding direction of the A-phase coil C1 opposes the magnetized boundary of the magnet 9, and the center in the winding direction of the B-phase coil C2 opposes substantially the center in the lengthwise direction of S pole of the magnet 9, since the first Hall element 26a is located in the magnetized boundary of the magnet 20 for detecting the position, and the second Hall element 26b is located in the center in the lengthwise direction of S pole of the magnet 20 for detecting the position, the drive current does not flow to the A-phase coil C1 to become uncircularized condition, and the drive current flows to the B-phase coil C2 in the positive direction (in the direction toward the inner side of the paper in FIG. 4) to become circularized condition in the positive direction.

In the case where the movable member 3 is moved forward by 3λ/2 from the initial condition, thereby the center in the winding direction of the A-phase coil C1 opposes the center in the lengthwise direction of S pole of the magnet 20 for detecting the position, and the center in the winding direction of the B-phase coil C2 opposes substantially the magnetized boundary of the magnet 20 for detecting the position, since the first Hall element 26a is located in the center in the lengthwise direction of S pole of the magnet 20 for detecting the position, and the second Hall element 26b is located in the magnetized boundary of the magnet 20 for detecting the position, the drive current flows to the A-phase coil C1 in the positive direction (in the direction toward the inner side of the paper in FIG. 4) to become circularized condition in the positive direction, and the drive current does not flow to the B-phase coil C2 to become uncircularized condition.

Thus, the uncircularized condition with respect to the A-phase coil C1 and the B-phase coil C2, and the circularized condition in the positive direction and the negative direction are repeated in sequence, thereby the movable member 3 moves forward.

When it is in focus, the source voltages Vs1 and Vs2 are made OV to make both of the A-phase coil C1 and the B-phase coil C2 to be uncircularized condition, and the movable member 3 is to be stopped at the position in focus.

Figure 5:
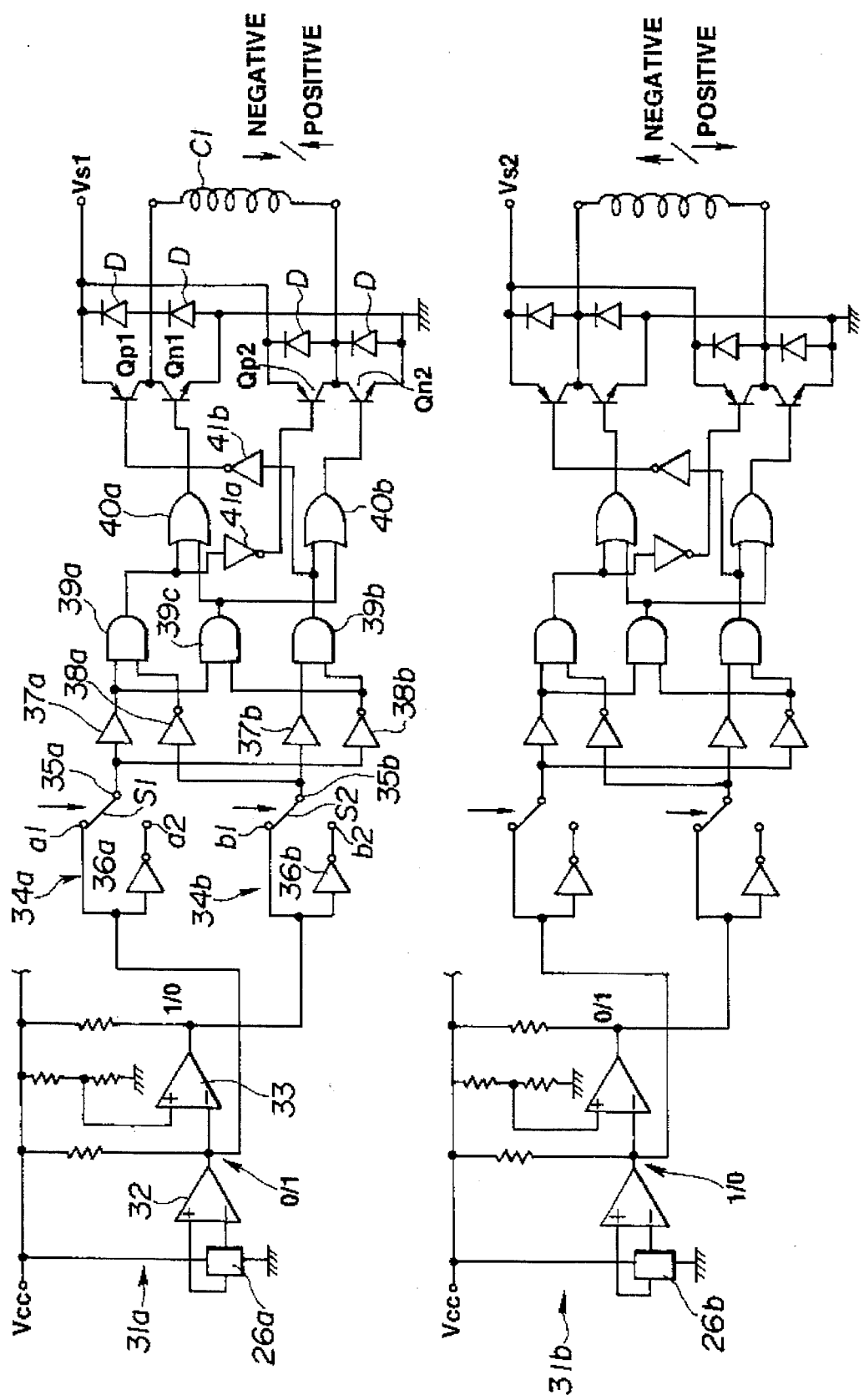
FIG. 5 is a circuit diagram showing the structure of the driving circuit assembled in the focus control device according to the first example.

In the case of using the circuit of FIG. 5 as the driving circuit, square waves are supplied to the A-phase coil C1 and B-phase coil C2, respectively. But a sine curve and a cosine curve may be supplied to the A-phase coil C1 and B-phase coil C2, respectively. In the case when the changes with lapse of time of the flux linkage φ applied to the A-phase coil c1 and the B-phase coil C2 are seen, by plotting time along the abscissa and the flux linkage φ (magnetic flux contributing to the thrust generation) along the ordinate, the change curve plots, as shown in FIG. (a), a sine curve (shown in solid line "a")of 1 period=2λ with respect to the A-phase coil C1, and plots a cosine curve (shown in broken line "b") of 1 period=2λ with respect to the B-phase coil C2.

Furthermore, when the changes with lapse of time of the drive current which flows to the A-phase coil C1 and the B-phase coil C2 are seen, by plotting time along the abscissa and the drive current along the ordinate, the change curve plots, as shown in FIG. (b), similarly as in the change curve of said flux linkage φ, a sine curve (shown in solid line "a") of 1 period=2λ with respect to the A-phase coil C1, and plots a cosine curve (shown in broken line "b") of 1 period=2λ with respect to the B-phase coil C2.

Figure 6A:
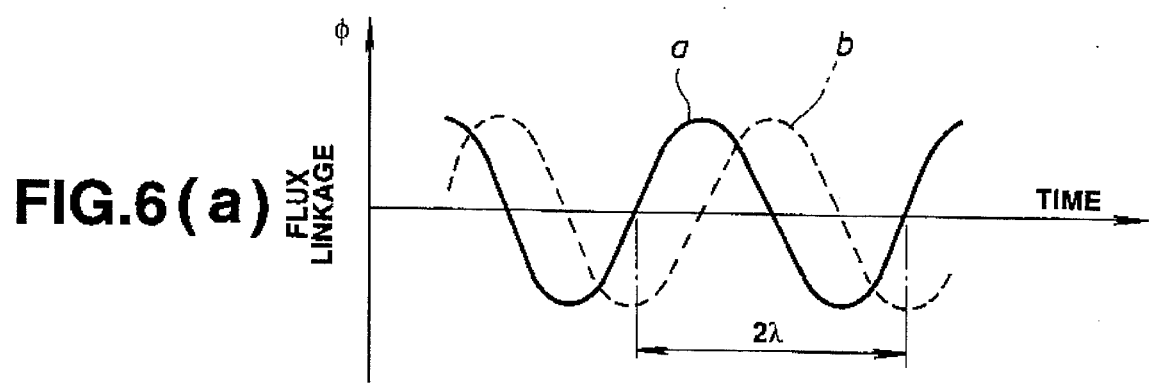
FIG. 6, comprised of FIGS. 6(a) to 6(c), is a characteristic curve showing the change in the density of the flux linkage applied to the A-phase coil and the B-phase coil, the drive current supplied to the A-phase coil and the B-phase coil, and the thrust applied to the movable member, when the movable member moves forward in the focus control device according to the first example.
Figure 6B:
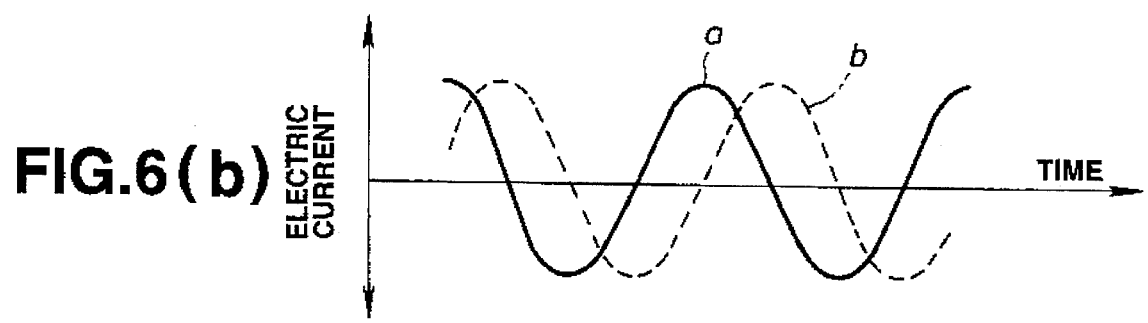
Figure 6C:
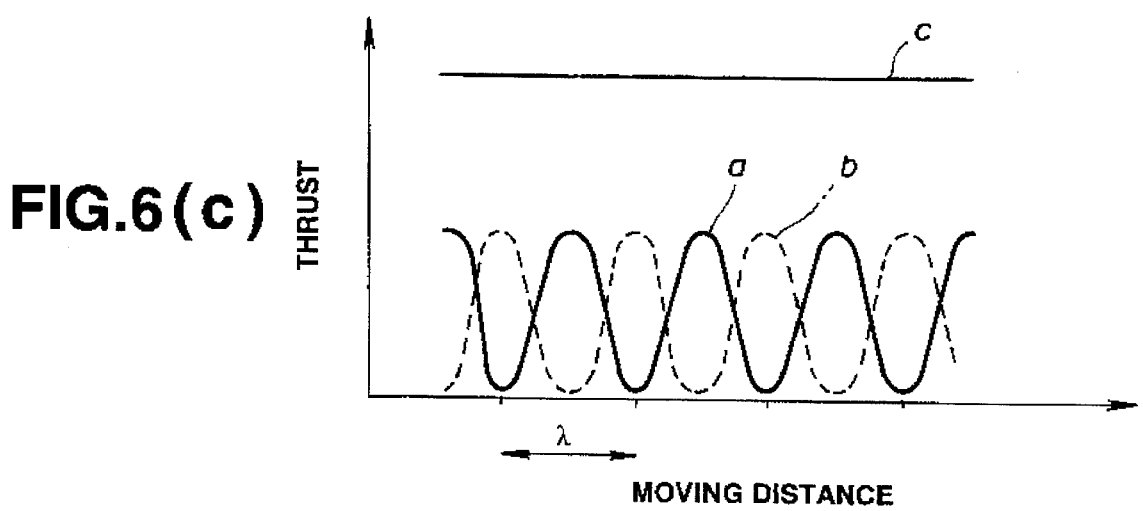

And the thrust applied to the A-phase coil C1 plots a curve (shown in solid line "a") which takes the maximum value in the portion corresponding to the maximum value and the minimum value in the characteristic curve of the flux linkage φ with respect to the A-phase coil C1 shown in FIG. 6(a), and takes the minimum value in the portion corresponding to zero point, and the thrust applied to the B-phase coil C2 plots a curve (shown in broken line "b") which takes the maximum value in the portion corresponding to the maximum value and the minimum value in the characteristic curve of the flux linkage φ with respect to the B-phase coil C2 shown in FIG. 6(a), and takes the minimum value in the portion corresponding to zero point.

In this case, the maximum value (or the minimum value) of the A-phase coil C1 and the maximum value (or the minimum value) of the B-phase coil C2 appear alternately, and the thrust summing up them, that is, the thrust applied to the movable member 3 becomes substantially a straight line as shown in the straight line "c", and operates uniformly in the lengthwise direction of the movable member 3.

Figure 7A:
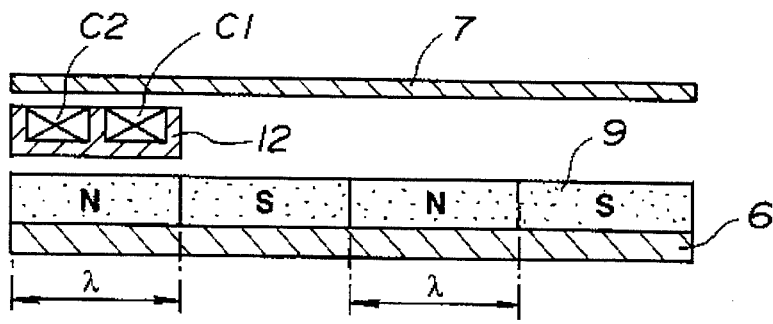
FIG. 7, comprised of FIGS. 7(a) to 7(c), is a structural view showing the relations between the magnetized width of the magnet for generating the thrust bonded to the inside yoke, particularly the magnetized width of both ends and the magnetized width of the central portion.
Figure 8:
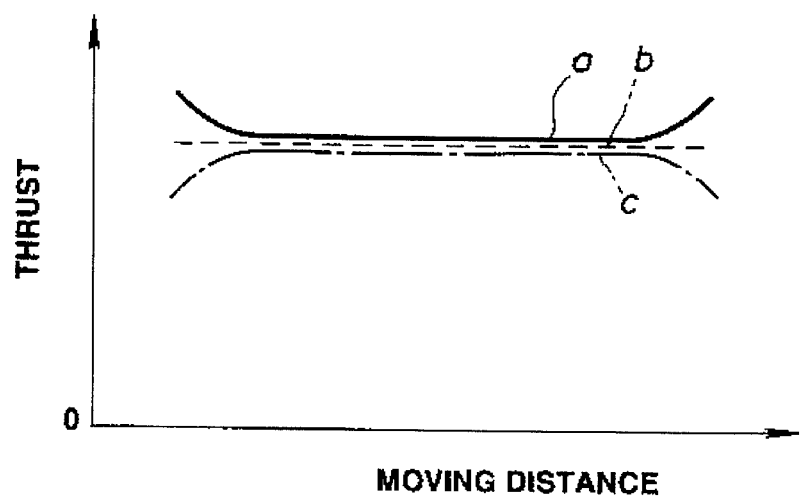
FIG. 8 is a characteristic curve showing the change of the thrust due to the difference of the magnetized width of both ends and the magnetized width of the central portion of the magnet for generating the thrust bonded to the inside yoke.

Here, seeing the relation between the magnetized width of the magnet 9 bonded to the inside yoke 6, particularly the magnetized width of both ends and the thrust, as shown in FIG. 7(a), in the case where the magnetized width of both ends is the same with the magnetized width λ of the central portion, as shown in the characteristic curve (shown in solid line "a") of FIG. 8, when the movable member 3 moves in the center in the lengthwise direction of the magnet 9, the thrust is applied substantially uniformly, but when the movable member 3 moves in the portion corresponding to both ends of the magnet 9, the thrust applied to the movable member 3 increases. Therefore, the movable member 3 abruptly accelerates the moving speed when it reaches the vicinity of both ends, thereby such a problem is caused that it becomes difficult to detect the position of the movable member 3 by the Hall elements 26a and 26b and to adjust the focus by the focus lens 10, and there is a fear that the movable member 3 may collide with the inner wall of the back end of the outer housing 1 or other assembly member constituting the forward mirror cylinder.

Figure 7B:
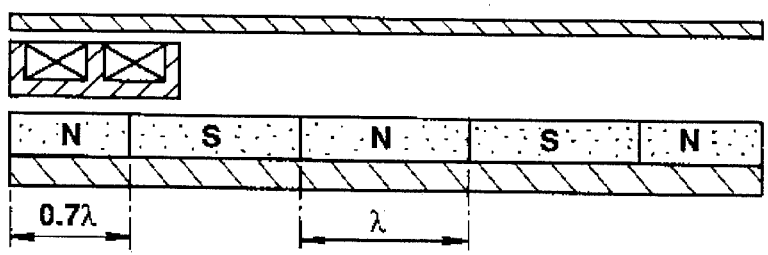

Next, as shown in FIG. 7(b), in the case where the magnetized width of both ends is 0.7 times as long as the magnetized width λ of the central portion, as shown in the characteristic curve (shown in broken line "b") of FIG. 8, the thrust is applied uniformly to the movable member 3 over the whole lengthwise direction of the magnet 9, and the movable member 3 is prevented from accelerating the moving speed abruptly, thereby it becomes easy to detect the position of the movable member 3 by the Hall elements 26a and 26b, and it becomes possible to adjust the focus precisely by the focus lens 10.

Figure 7C:
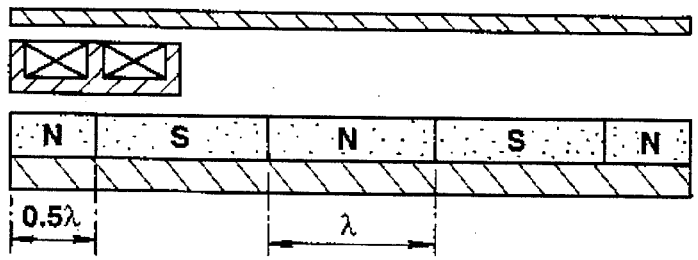

Next, as shown in FIG. 7(c), in the case where the magnetized width of both ends is 0.5 times as long as the magnetized width λ of the central portion, as shown in the characteristic curve (shown in one-dot chain line "c") of FIG. 8, when the movable member 3 moves in the center in the lengthwise direction of the magnet 9, the thrust is applied substantially uniformly to the movable member 3, but when the movable member 3 moves in the portion corresponding to both ends of the magnet 9, the thrust applied to the movable member 3 decreases. Therefore, the moving speed of the movable member 3 decreases when it reaches the vicinity of both ends. In this case, since the speed decreases, it is easier to detect the position of the movable member 3 by the Hall elements 26a and 26b and to adjust the focus by the focus lens 10, as shown in solid line "a" of FIG. 8 (corresponding to FIG. 7(a)), compared to the case where the moving speed increases. Furthermore, there is no fear that the movable member 3 may collide with the inner wall of the back end of the outer housing 1 or other assembly member constituting the forward mirror cylinder.

Therefore, it is preferred that the magnetized width of both ends of said magnet 9 be 0.5 to 0.7 times as long as the magnetized width λ of the central portion.

Furthermore, when seeing the density of the magnetic flux coming from N pole of said magnet 9 bonded to the inside yoke 9 toward the outside yoke 7, as shown in FIG. 9, since about the half of the magnetic flux coming from the magnet 9 does not reach the outside yoke 7 on the opposite side, the thickness of the outside yoke 7 can be about half of that of the inside yoke 6, thereby it can be attained to make the thickness of the outside yoke thinner.

Thus, in the focus control device according to said first example, since a magnet 20 for detecting the position is provided to detect the position of the movable member 3, and the Hall elements 26a and 26b are provided in the fixed member 2, which detect the magnetic field of the magnet 20 for detecting the position to detect the position of the movable member 3 and generate a position-detecting signal to control the current supply to the A-phase coil C1 and the B-phase coil C2, the electric wiring may be carried out to the Hall elements 26a and 26b set in the fixed member 2, and it is not required to carry out wiring to the movable member 3. Therefore, restrictions in the moving range and decrease in the moving speed due to the wiring and the like to the movable member 3 are not caused with respect to the position detection of the movable member 3, and the movement of the movable member 3 can be made smoothly according to the current supply to the A-phase coil C1 and the B-phase coil C2.

Furthermore, when the magnet 9 for generating the thrust is multipolarly magnetized, and the magnetized width of the ends is made to be 0.5 to 0.7 times as long as the magnetized width λ of the central portion, the thrust applied to the movable member 3 becomes substantially uniform over the whole moving range. Particularly, when it is 0.7 times, the uniformity characteristic becomes conspicuous. When the thrust becomes uniform over the whole moving range, abrupt decrease and increase of the moving speed of the movable member 3 are not caused, and the movement of the movable member 3 becomes quite smooth. As a result, the position detection of the movable member 3 can be easily carried out.

Furthermore, since the magnet 9 for generating the thrust is multipolarly magnetized, it can be prevented to concentrate the magnetic flux from the magnet 9 on one or two spots, and the magnetic flux from said magnet 9 can be applied to the whole A-phase coil C1 and the B-phase coil C2. As a result, even if the yoke thickness of the inside yoke 8 and the outside yoke 7 is made thinner, it can be possible to move the movable member 3 efficiently, and it can be realized to make the focus control device per se light.

Furthermore, in the focus control device according to the first example, when the movable member 3 is assembled to the fixed member 2 fixed to the outer housing 1, the movable member 3 is inserted into the outer housing 1 while penetrating axes 4a and 4b extending from the outer housing 1 respectively into respective penetrating holes 15a and 15b in the first and the second bearing plates 18a and 18b of the movable member 3. At this time, the first and the second bearing plates 16a and 16b of the movable member 3 passes through the notch 8 provided in the inside yoke 6 and the outside yoke 7 of the fixed member 2, and the inside yoke 6 to which the magnet is bonded is penetrated into the penetrating portion 24 in the movable member. As a result, the focus lens 10 of the movable member 3 is housed in the fixed member 2.

In this case, since the focus lens 10 of the movable member 3 is housed in the fixed member 2, the focus lens 10 moves in the fixed member 2 with the movement of the movable member 3, the moving range thereof becomes at least the distance which subtracts the length in the axial direction of the bobbin 12 from the length in the axial direction of the fixed member 2. As a result, it is not required to provide a relief corresponding to the moving distance in the bobbin 12 as in the conventional case. Thus, in said first example, the movable member 3 can be moved in a condition that the focus lens is housed in the fixed member 2, and it can be possible to shorten the length of the focus control device itself substantially up to the length of the fixed member 2, and down-sizing of the focus control device itself can be designed. Here, when the movable range is assumed to be 10 mm, in the conventional focus control device, 28 mm was required as the length in the axial direction, however in the focus control device according to said first example, the length can be reduced to 18 mm.

Furthermore, from the general point of view, it is made possible to apply the focus control device (driving device in the voice coil motor system) generally applied to the movement in a minute distance also for the movement in a long distance, and the down-sizing is attained simultaneously.

Incidentally, in said example, the shape of two axes 4a and 4b provided in the outer housing 1 is made to be substantially circular cross-sectionally, the cross sectional shape may be oval, differing from the circular shape, to make do with one axis.

Next, the focus control device according to the second example will be described with reference to FIGS. 10 to 12. The same reference numeral will be used for the ones corresponding to FIG. 4.

Figure 10:
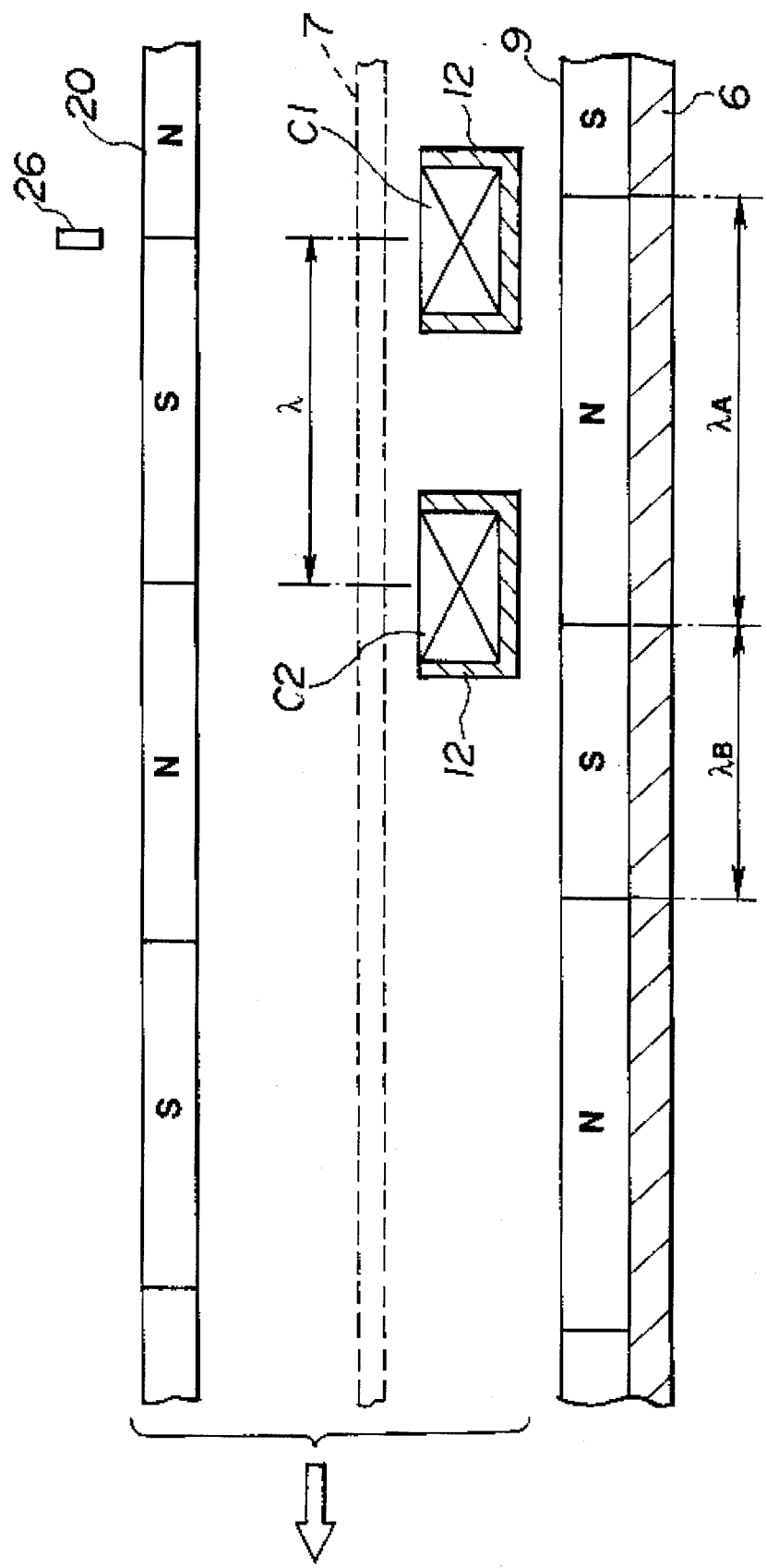
FIG. 10 is a view illustrating the structure of the main part of the focus control device according to the second example.

The focus control device according to the second example has substantially the same structure with the focus control device according to said first example, as shown in FIG. 10, but differs in that one magnetized width $\lambda A$ and the other magnetized width $\lambda B$ in the central portion other than end portions of the magnet 9 bonded to the inside yoke 6 are different, that the average of one magnetized width $\lambda A$ and the other magnetized width $\lambda B$ is, that the alienated width of the center in the winding direction of each phase in the A-phase coil C1 and the B-phase coil C2 is, that one Hall element 26 which is the position-detecting means is provided, and that an elastic return means (not shown) such as an extension spring is interposed between the movable member 3 and the inner wall of the back end face of the outer housing 1.

In this case, said Hall element 26 is provided in a position located in the magnetized boundary of the magnet 20 for detecting the position, when the center in the winding direction of the A-phase coil C1 is located in a position alienated by $\lambda/2$ from the magnetized center of the magnet 9. Furthermore, the relation between the coils C1 and C2 of each phase and the magnetized direction of the magnet 20 for detecting the direction is such that the center in the winding direction of the A-phase coil C1 coincides substantially with the magnetized boundary, and the center in the winding direction of the B-phase coil C2 coincides substantially with the next magnetized boundary.

Furthermore, the magnetized width of both ends of the magnet 9 in this focus control device is $0.5\lambda$ to $0.7\lambda$, as in said first example, and the magnetized width in the central portion other than both ends of the magnet 20 for detecting the position is also $\lambda$, as in said first example, and the magnetized width of both ends thereof is set to be $0.5\lambda$–to $0.7\lambda$.

Furthermore, in this focus control device, the direction of the drive current supplied to the A-phase coil C1 and the B-phase coil C2 is one way only, and the direction to which the movable member 3 is moved by excitation is one way only from the vicinity of the inner wall of the back end face of the outer housing to the forward direction. The movement to backward of the movable member 3 is carried out by an elastic return means such as said extension spring.

Now, the driving circuit of the focus control device according to the second example will be described with reference to FIG. 11. This driving circuit is composed of, in the first stage, a differential amplifier 51 to which the Hall voltage of the Hall element 26 is applied, the first output amplifier 52 to which the output signal from the differential amplifier 51 is directly input, the second output amplifier 54 to which the output signal from said differential amplifier 51 is input via an inverter 53, the first NPN transistor Q1 in which the output signal from said first output amplifier 52 is supplied to the base and the emitter is earth connection, and the second NPN transistor Q2 in which the output signal from said second output amplifier 54 is supplied to the base and the emitter is earth connection. And the A-phase coil C1 is inserted in and connected to between the first NPN transistor Q1 and the power source (the source voltage Vs), and B-phase coil C2 is inserted in and connected to between the second NPN transistor Q2 and the power source (the source voltage Vs).

Handling of the signal of said driving circuit in the case where the movable member 3 moves forward will now be described. First, in the situation that the Hall element 26 opposes N pole of the magnet 20 for detecting the position and the positive magnetic field is applied to the Hall element 28, since the output signal from the differential amplifier 51 becomes "1" logically, the first NPN transistor Q1 is operated to be ON, and certain current flows to the A-phase coil C1 to become circularized state. At this time, in the B-phase coil C2, the second NPN transistor Q2 is operated to be OFF to become uncircularized state.

On the contrary, in the situation where the Hall element 26 opposes S pole of the magnet 20 for detecting the position and the negative magnetic field is applied to the Hall element 26, since the output signal from the differential amplifier 51 becomes "0" logically, the second NPN transistor Q2 is operated to be ON, and certain current flows to the B-phase coil C2 to become circularized state. At this time, in the A-phase coil C1, the first NPN transistor Q1 is operated to be OFF to become uncircularized state.

Concretely speaking, when the center in the winding direction of the A-phase coil C1 is located in a position corresponding to the magnetized boundary of the magnet 9, as shown in FIG. 12(a), the density $\phi$ of the flux linkage applied to the A-phase coil C1 becomes zero, and since the B-phase coil C2 is located in a position almost included within the N pole of the magnet 9, it becomes a state where the flux linkage in the positive direction is applied. At this time, since the Hall element 26 is relatively located in a position corresponding to S pole of the magnet 20 for detecting the position, the drive current in the positive direction flows to the B-phase coil C2.

Afterwards, as the A-phase coil C1 moves toward the N pole side of the magnet 9, the density φ of the flux linkage in the positive direction applied to the A-phase coil C1 gradually increases, and when the Hall element 26 reaches the position relatively corresponding to the magnetized boundary of the magnet 20 for detecting the position, the supply of the drive current to the B-phase coil is changed over to the A-phase coil C1. This stage is assumed to be the initial stage.

As the A-phase coil C1 moves further toward N pole of the magnet 9, the B-phase coil C2 enters into the S pole side of the magnet 9, and when the center in the winding direction of the B-phase coil C2 comes to a position corresponding to the magnetized boundary of the magnet 9, the density φ of the flux linkage applied to the B-phase coil C2 becomes zero. At this time, one end portion of the A-phase coil C1 comes to a position corresponding to the magnetized boundary of the magnet 9.

And from this stage to the stage where the other end portion of the A-phase coil C1 comes to a position corresponding to the next magnetized boundary of the magnet 9, the flux linkage in the positive direction having substantially certain density is to be applied to the A-phase coil C1. During this stage, the flux linkage in the negative direction is to be applied to the B-phase coil C2.

Then, as the A-phase coil C1 moves further, the density φ of the flux linkage in the negative direction applied to the B-phase coil C2 gradually decreases, and when the center in the winding direction of the B-phase coil C2 is located in the magnetized boundary of the magnet 9, the density φ of the flux linkage applied to the B-phase coil C2 becomes zero, and as the A-phase coil C1 moves further, the density φ of the flux linkage in the positive direction applied to the B-phase coil C2 gradually increases. On the other hand, since the A-phase coil C1 enters into the S pole side of the magnet 9, the density φ of the flux linkage in the positive direction applied to the A-phase coil C1 gradually decreases. During this period, when the Hall element 26 comes to a position relatively corresponding to the magnetized boundary of the magnet 20 for detecting the position, the supply of the drive current to the A-phase coil C1 is again changed over to the B-phase coil C2 side.

And, when the center in the winding direction of the A-phase coil C1 comes to a position corresponding to the magnetized boundary of the magnet 9, the density φ of the flux linkage applied to the A-phase coil C1 becomes zero. At this time, one end portion of the B-phase coil C2 comes to a position corresponding to the magnetized boundary of the magnet 9.

From this stage to the stage where the other end portion of the B-phase coil C2 comes to a position corresponding to the next magnetized boundary of the magnet 9, the flux linkage in the positive direction having substantially certain density is to be applied to the B-phase coil C2. During this stage, the flux linkage in the negative direction is to be applied to the A-phase coil C1.

Then, as the A-phase coil C1 moves further, the density φ of the flux linkage in the negative direction applied to the A-phase coil C1 gradually decreases, and when the center in the winding direction of the A-phase coil C1 is located in the magnetized boundary of the magnet 9, the density φ of the flux linkage applied to the A-phase coil C1 becomes zero, and as the A-phase coil C1 moves further toward the N pole side of the magnet 9, the density φ of the flux linkage in the positive direction applied to the A-phase coil C1 gradually increases. And, when the Hall element 26 comes to a position relatively corresponding to the magnetized boundary of the magnet 20 for detecting the position, the supply of the drive current to the B-phase coil C2 is changed over to the A-phase coil C1 side to become the same state as said initial stage. These series of actions are repeated to move the movable member 3 forward.

Thus, in the stage where the flux linkage in the positive direction is applied to the A-phase coil C1, and the Hall element 26 is in a position corresponding to N pole of the magnet 20 for detecting the position, as shown in solid line in FIG. 12(b), the drive current in one direction flows to the A-phase coil C1 to become the circularized state, and during this period, the B-phase coil C2 becomes uncircularized state. Furthermore, in the stage where the flux linkage in the positive direction is applied to the B-phase coil C2, and the Hall element 26 is in a position corresponding to S pole of the magnet 20 for detecting the position, as shown in solid line in FIG. 12(b), the drive current in one direction flows to the B-phase coil C2 to become the circularized state, and during this period, the A-phase coil C1 becomes uncircularized state.

Accordingly, the thrust which affects to the movable member 3, as shown in FIG. 12(c), approximates to the combined component of the proportional component of the density φ of the flux linkage in the positive direction applied to the A-phase coil C1 while the A-phase coil C1 becomes the circularized state and the proportional component of the density φ of the flux linkage in the positive direction applied to the B-phase coil C2 while the B-phase coil C2 becomes the circularized state, thereby substantially constant thrust is to be affected over the whole moving range of the movable member 3.

In the focus control device according to the second example, as in the focus control device according to the first example, restrictions in the moving range and decrease of the moving speed due to the wiring and the like to the movable member 3 are not caused with respect to the position detection of the movable member 3, and the movement of the movable member 3 can be made smoothly in response to the current supply to the coils, and the thrust applied to the movable member 3 can be made substantially constant over the whole moving range, thereby the movement of the movable member 3 becomes quite smooth, and the position detection of the movable member 3 can be easily made.

Furthermore, since the magnet 9 for generating the thrust is multipolarly magnetized, it can be prevented to concentrate the magnetic flux from the magnet 9 on one or two spots, and the magnetic flux from said magnet 9 can be applied to the whole A-phase coil C1 and the B-phase coil C2. As a result, even if the yoke thickness of the inside yoke 6 and the outside yoke 7 is made thinner, it can be possible to move the movable member 3 efficiently, and lightening of the focus control device per se can be realized.

Furthermore, the movable member 3 can be moved in a state that the focus lens 10 is housed in the fixed member 2, and the length of the device itself can be reduced substantially up to the length of the fixed member 2, thereby the down-sizing of the focus control device itself can be designed.

Next, the focus control device according to the third example will be described with reference to FIGS. 13 to 15.

The same reference numeral will be used for the ones corresponding to FIG. 4.

Figure 13:
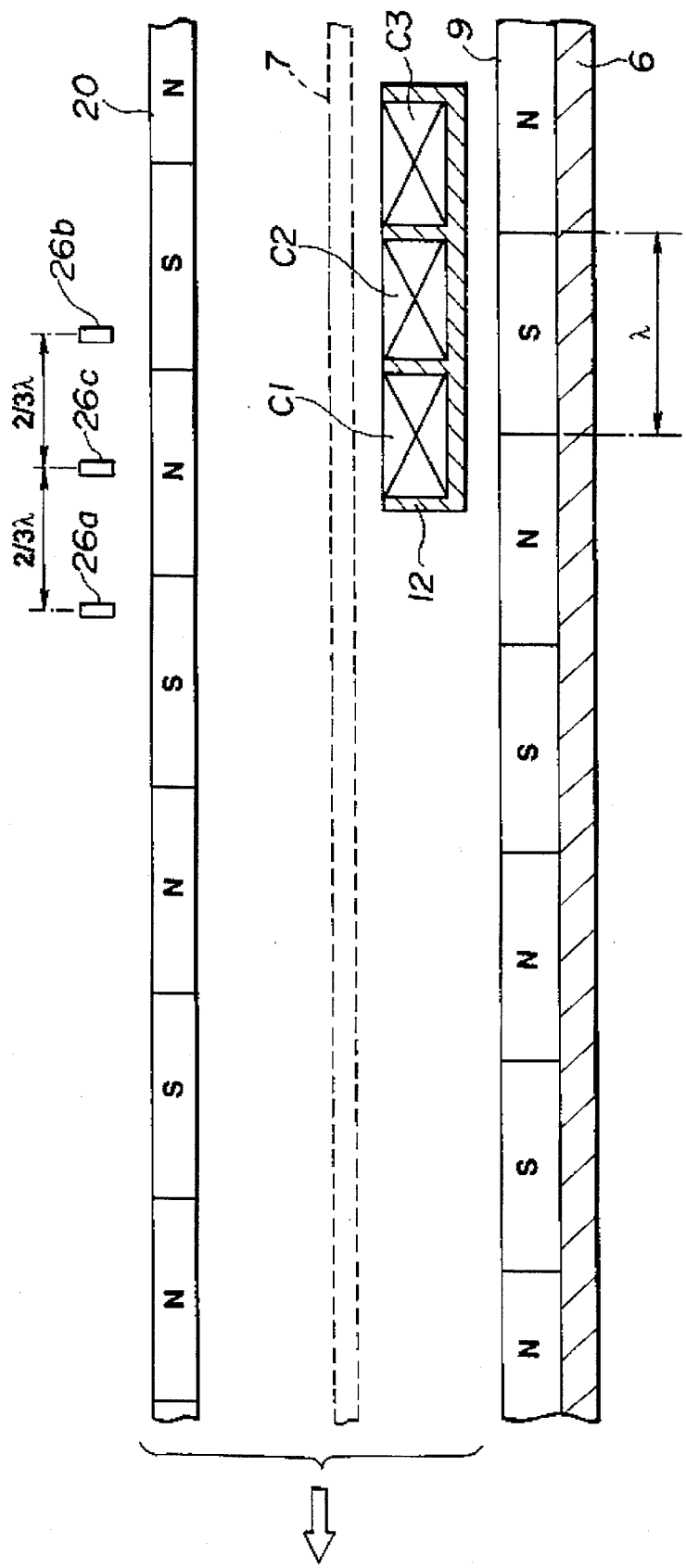
FIG. 13 is a view illustrating the structure of the main part of the focus control device according to the third example.

The focus control device according to the third example has substantially the same structure with the focus control device according to said first example, as shown in FIG. 13, but differs in that coils of three-phases A-phase coil C1, B-phase coil C2, and C-phase coil C3) are wound to the bobbin 12, that the alienated width of the center in the winding direction in the A-phase coil C1 and the B-phase coil C2 is $2\lambda/3$, and that three Hall elements, that is, the first Hall element 26a with respect to the A-phase coil C1, the third Hall element 26c with respect to the C-phase coil C3 and the second Hall element 26b with respect to the B-phase coil C2 are provided in order toward backward direction. In this case, the alienated width between each Hall element 26a, 26b and 26c is $2\lambda/3$, respectively.

Furthermore, the relation between the coils C1 to C3 of each phase and the magnetized direction of the magnet 20 for detecting the position is such that the boundary of the A-phase coil C1 and the B-phase coil C2 coincides substantially with the magnetized boundary, and that the center in the winding direction of the C-phase coil C3 coincides substantially with the next magnetized boundary.

Figure 14:
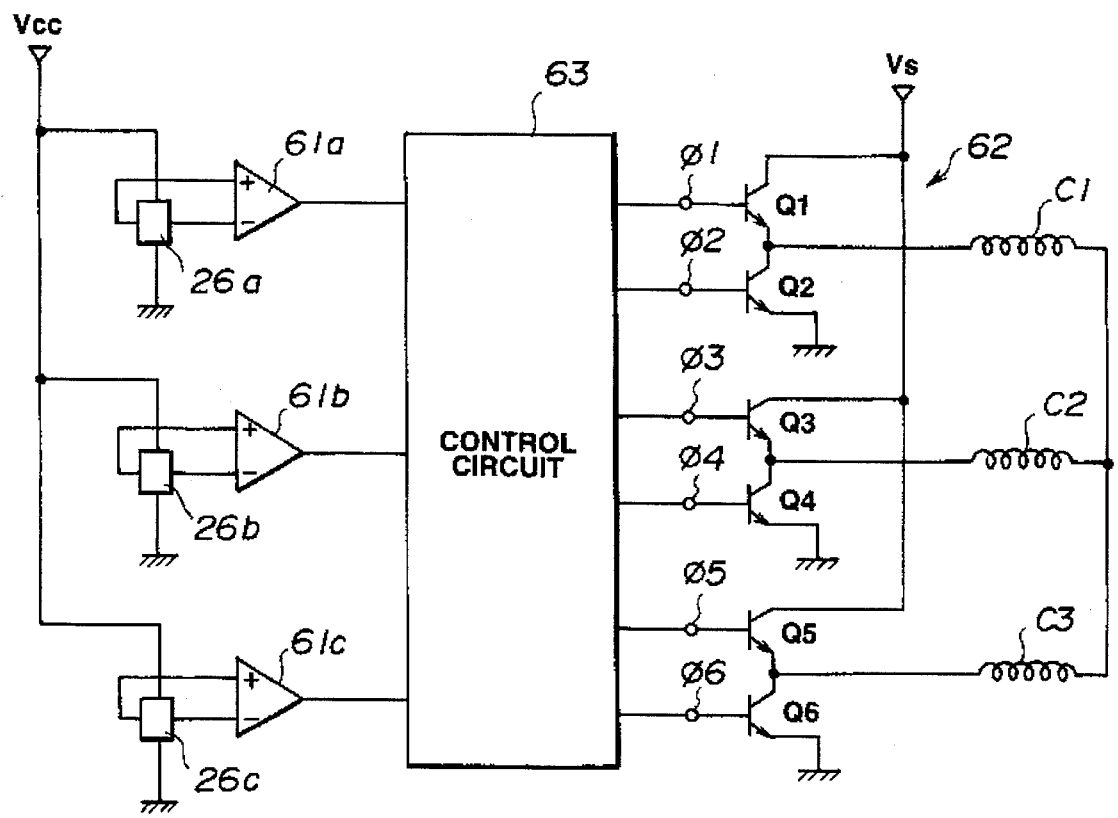
FIG. 14 is a circuit diagram showing the structure of the driving circuit assembled in the focus control device according to the third example.

The driving circuit of the focus control device according to the third example comprises, as shown in FIG. 14, the first, the second and the third differential amplifier 61a, 61b and 61c to which each Hall voltage of the first, the second and the third Hall elements 26a, 26b and 28c are supplied, and a control circuit 63 which selectively controls ON/Off of the switching circuit 62 comprising six NPN transistors (the first to the sixth NPN transistors Q1 to Q6) on the final stage based on the output signal from the first to the third differential amplifiers 61a to 61c.

The switching circuit 62 is composed of two transistors connected in series, respectively, and collectors of the first, the third and the fifth NPN transistors Q1, Q3 and Q5 are connected with the source (source voltage Vs), and the emitters of the second, the fourth and the sixth NPN transistors Q2, Q4 and Q6 are connected to the ground. Furthermore, the one ends of the A-phase coil C1, the B-phase coil C2 and the C-phase coil C3 are respectively connected to each series node, and the other ends of these coils C1, C2 and C3 are commonly connected. And, to the base of each NPN transistor Q1 to Q6 are connected with wiring six output terminals (the first to the sixth output terminals $\phi1$ to $\phi6$) derived from the control circuit 63.

The first to the third differential amplifiers 81a to 81c output a high-level signal (logically, a signal of "1"), based on that the positive magnetic field is applied to each Hall element 26a to 26c, since the corresponding the first to the third Hall elements 26a to 26c oppose N pole of the magnet 20 for detecting the position. On the contrary, the first to the third differential amplifiers 61a to 61c output a low-level signal (logically, a signal of "0"), based on that the negative magnetic field is applied to each Hall element 26a to 28c, since the corresponding the first to the third Hall elements 26a to 26c oppose S pole of the magnet 20 for detecting the position.

The control circuit 63 selectively controls ON/OFF of the first to the six NPN transistors Q1 to Q6 based on the output signal from the first to the third differential amplifiers 61a to 61c, as described below.

Namely, when the output signal from the first differential amplifier 61a becomes "1" logically, the control circuit output a high-level signal from the first output terminal $\phi1$ to switch the first NPN transistor Q1 ON. And when the output signal from the second differential amplifier 61b becomes "1" logically, the control circuit output a low-level signal from the first output terminal $\phi1$ to switch the first NPN transistor Q1 OFF, and at the same time, output a high-level signal from the third output terminal $\phi3$ to switch the third NPN transistor Q3 ON. And when the output signal from the third differential amplifier 61c becomes "1" logically, the control circuit output a low-level signal from the third output terminal $\phi2$ to switch the third NPN transistor Q3 OFF, and at the same time, output a high-level signal from the fifth output terminal $\phi5$ to switch the fifth NPN transistor Q5 ON. The fifth NPN transistor Q5 becomes OFF, when the output signal from the first differential amplifier 61a becomes "1" logically.

Furthermore, when the output signal from the first differential amplifier 61a becomes "0" logically, the control circuit output a high-level signal from the second output terminal $\phi2$ to switch the second NPN transistor Q2 ON. And when the output signal from the second differential amplifier 61b becomes "0" logically, the control circuit output a low-level signal from the second output terminal $\phi2$ to switch the second NPN transistor Q2 OFF, and at the same time, output a high-level signal from the fourth output terminal $\phi4$ to switch the fourth NPN transistor Q4 ON. And when the output signal from the third differential amplifier 61c becomes "0" logically, the control circuit output a low-level signal from the fourth output terminal $\phi4$ to switch the fourth NPN transistor Q4 OFF, and at the same time, output a high-level signal from the sixth output terminal $\phi6$ to switch the sixth NPN transistor Q6 ON. The sixth NPN transistor Q6 becomes OFF, when the output signal from the first differential amplifier 61a becomes "0" logically.

Figure 15A:
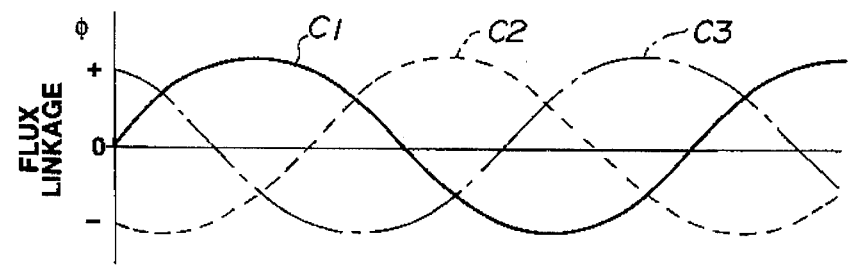
FIG. 15, comprised of FIGS. 15(a) to 15(d) is a characteristic curve showing the change in the density of the flux linkage applied to the A-phase coil, the B-phase coil and the C-phase coil, the on/off timing of the first to the sixth NPN transistors connected to the final stage of the driving circuit, the drive current supplied to the A-phase coil, the B-phase coil and the C-phase coil, and the thrust applied to the movable member, when the movable member moves forward in the focus control device according to the third example.

Handling of the signal of said driving circuit in the case where the movable member 3 moves forward will now be described. First, when the center in the winding direction of the A-phase coil C1 is in a position corresponding to the magnetized boundary of the magnet 9, as shown in FIG. 15(a), the density $\phi$ of the flux linkage applied to the A-phase coil C1 becomes zero. In this case, the B-phase coil C2 is in a state where the flux linkage in the negative direction is applied thereto, since it is in a position where it is included almost within S pole of the magnet 9. And the C-phase coil C3 is in a state where the flux linkage in the positive direction is applied thereto, since it is in a position where it is included almost within N pole of the magnet 9. Furthermore, in this case, since only the fourth and the fifth NPN transistors Q4 and Q5 are ON state, as shown in FIG. 15(a), the A-phase coil C1 is in the uncircularized state, the B-phase coil C2 is in the circularized state in the negative direction, and the C-phase coil C3 is in the circularized state in the positive direction. This state is assumed to be the initial stage.

Figure 15B:
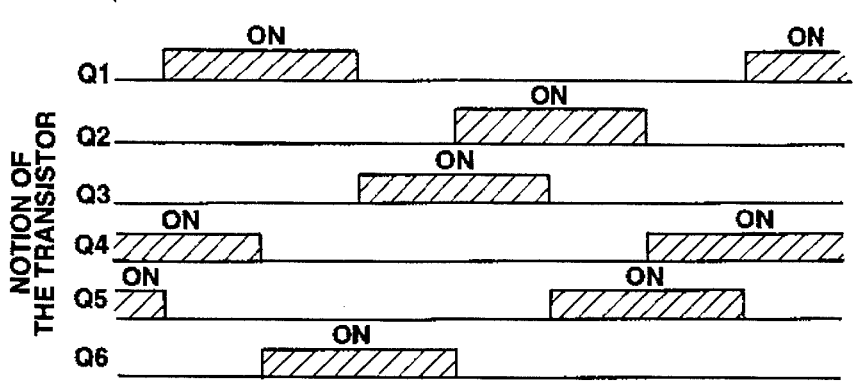
Figure 15C:
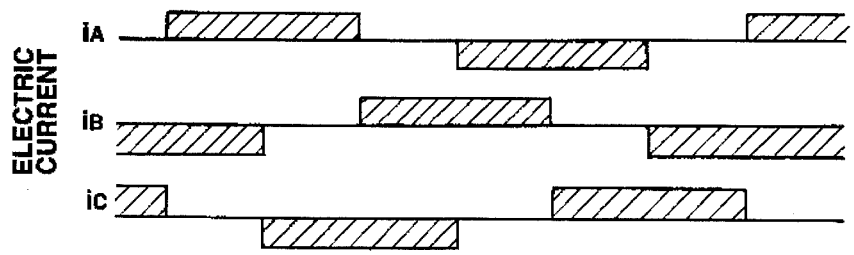

Furthermore, when the movable member 3 moves forward, the A-phase coil C1 is to enter into the N pole side of the magnet 9, thereby, as shown in FIG. 15(a), the density $\phi$ of the flux linkage in the positive direction applied to the A-phase coil C1 gradually increases. On the contrary, since the C-phase coil C3 is to enter into the S pole side of the magnet 9, the density of the flux linkage in the positive direction applied to the C-phase coil C3 gradually decreases. And when the first Hall element 26a is relatively in a position on the magnetized boundary of the magnet 20 for detecting the position, the length of N pole opposite to the A-phase coil C1 and the length of N pole opposite to the C-phase coil C3 becomes substantially equal, thereby the density of the flux linkage in the positive direction applied to the A-phase coil C1 and the C-phase coil C3 becomes substantially equal. At this time, since the center in the winding direction of the B-phase coil C2 is located in the center in the lengthwise direction of S pole, the B-phase coil C2 is to receive the maximum flux linkage in the negative direction. Furthermore, at this time, as shown in FIG. 15(b), the first NPN transistor Q1 becomes ON state, and the fifth NPN transistor Q5 becomes OFF state. The fourth NPN transistor Q4 remains ON state. Thereby, as shown in FIG. 15(c), the C-phase coil C3 is in the uncircularized state, the A-phase coil C1 is in the circularized state as the drive current in the positive direction flows, and the B-phase coil C2 remains in the circularized state in the negative direction.

Furthermore, when the movable member 3 moves forward, thereby the third Hall element 26c arranged in the center is located relatively in the magnetized boundary of the magnet 20 for detecting the position, the length of S pole opposite to the B-phase coil C2 and the length of S pole opposite to the C-phase coil C3 becomes substantially equal, thereby the density $\phi$ of the flux linkage in the negative direction applied to the B-phase coil C2 and the C-phase coil C3 becomes substantially equal, as shown in FIG. 15(a). At this time, since the center in the winding direction of the A-phase coil C1 is located in the center in the lengthwise direction of N pole, the A-phase coil C1 is to receive the maximum flux linkage in the positive direction. Furthermore, at this time, as shown in FIG. 15(b), the sixth NPN transistor Q6 becomes ON state, and the fourth NPN transistor Q4 becomes OFF state. The first NPN transistor Q1 remains ON state. Thereby, as shown in FIG. 15(c), the B-phase coil C2 is in the uncircularized state, the C-phase coil C3 is in the circularized state as the drive current in the negative direction flows, and the A-phase coil C1 remains in the circularized state in the positive direction.

Furthermore, when the movable member 3 moves forward, thereby the second Hall element 26b arranged backward is located relatively in the magnetized boundary of the magnet 20 for detecting the position, the length of N pole opposite to the A-phase coil C1 and the length of N pole opposite to the B-phase coil C2 becomes substantially equal, thereby the density $\phi$ of the flux linkage in the positive direction applied to the A-phase coil C1 and the B-phase coil C2 becomes substantially equal, as shown in FIG. 15(a). At this time, since the center in the winding direction of the C-phase coil C3 is located in the center in the lengthwise direction of S pole, the C-phase coil C3 is to receive the maximum flux linkage in the negative direction. Furthermore, at this time, as shown in FIG. 15(b), the third NPN transistor Q3 becomes ON state, and the first NPN transistor Q1 becomes OFF state. The sixth NPN transistor Q6 remains ON state. Thereby, as shown in FIG. 15(c), the A-phase coil C1 is in the uncircularized state, the B-phase coil C2 is in the circularized state as the drive current in the positive direction flows, and the C-phase coil C3 still remains in the circularized state in the negative direction.

Furthermore, when the movable member 3 moves forward, thereby the first Hall element 26a arranged in forward is located relatively in the magnetized boundary of the magnet 20 for detecting the position, the length of S pole opposite to the A-phase coil C1 and the length of S pole opposite to the C-phase coil C3 becomes substantially equal, thereby the density $\phi$ of the flux linkage in the negative direction applied to the A-phase coil C1 and the C-phase coil C3 becomes substantially equal, as shown in FIG. 15(a). At this time, since the center in the winding direction of the B-phase coil C2 is located in the center in the lengthwise direction of N pole, the B-phase coil C2 is to receive the maximum flux linkage in the positive direction. Furthermore, at this time, as shown in FIG. 15(b), the second NPN transistor Q2 becomes ON state, and the sixth NPN transistor Q6 becomes OFF state. The third NPN transistor Q3 remains ON state. Thereby, as shown in FIG. 15(c), the C-phase coil C3 is in the uncircularized state, the A-phase coil C1 is in the circularized state as the drive current in the negative direction flows, and the B-phase coil C2 still remains in the circularized state in the positive direction.

Furthermore, when the movable member 3 moves forward, thereby the third Hall element 26c arranged in the center is located relatively in the magnetized boundary of the magnet 20 for detecting the position, the length of N pole opposite to the B-phase coil C2 and the length of N pole opposite to the C-phase coil C3 becomes substantially equal, thereby the density $\phi$ of the flux linkage in the positive direction applied to the B-phase coil C2 and the C-phase coil C3 becomes substantially equal, as shown in FIG. 15(a). At this time, since the center in the winding direction of the A-phase coil C1 is located in the center in the lengthwise direction of S pole, the A-phase coil C1 is to receive the maximum flux linkage in the negative direction. Furthermore, at this time, as shown in FIG. 15(b), the fifth NPN transistor Q5 becomes ON state, and the third NPN transistor Q3 becomes OFF state. The second NPN transistor Q2 remains ON state. Thereby, as shown in FIG. 15(c), the B-phase coil C2 is in the uncircularized state, the C-phase coil C3 is in the circularized state as the drive current in the positive direction flows, and the A-phase coil C1 still remains in the circularized state in the negative direction.

Furthermore, when the movable member 3 moves forward, thereby the second Hall element 26b arranged backward is located relatively in the magnetized boundary of the magnet 20 for detecting the position, the length of S pole opposite to the A-phase coil C1 and the length of S pole opposite to the B-phase coil C2 becomes substantially equal, thereby the density $\phi$ of the flux linkage in the negative direction applied to the A-phase coil C1 and the B-phase coil. C2 becomes substantially equal, as shown in FIG. 15(a). At this time, since the center in the winding direction of the C-phase coil C3 is located in the center in the lengthwise direction of N pole, the C-phase coil C3 is to receive the maximum flux linkage in the positive direction. Furthermore, at this time, as shown in FIG. 15(b), the fourth NPN transistor Q4 becomes ON state, and the second NPN transistor Q2 becomes OFF state. The fifth NPN transistor Q5 remains ON state. Thereby, as shown in FIG. 15(c), the A-phase coil C1 is in the uncircularized state, the B-phase coil C2 is in the circularized state as the drive current in the negative direction flows, and the C-phase coil C3 still remains in the circularized state in the positive direction.

Furthermore, the movable member 3 moves further forward, thereby at the stage where the center in the winding direction of the A-phase coil C1 comes to a position corresponding to the magnetized boundary of the magnet 9, the situation returns to the initial state. These series of actions are repeated to move the movable member 3 forward.

Figure 15D:
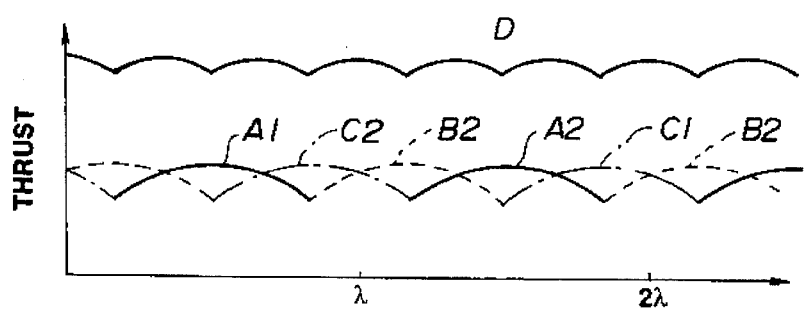
Figure 16:
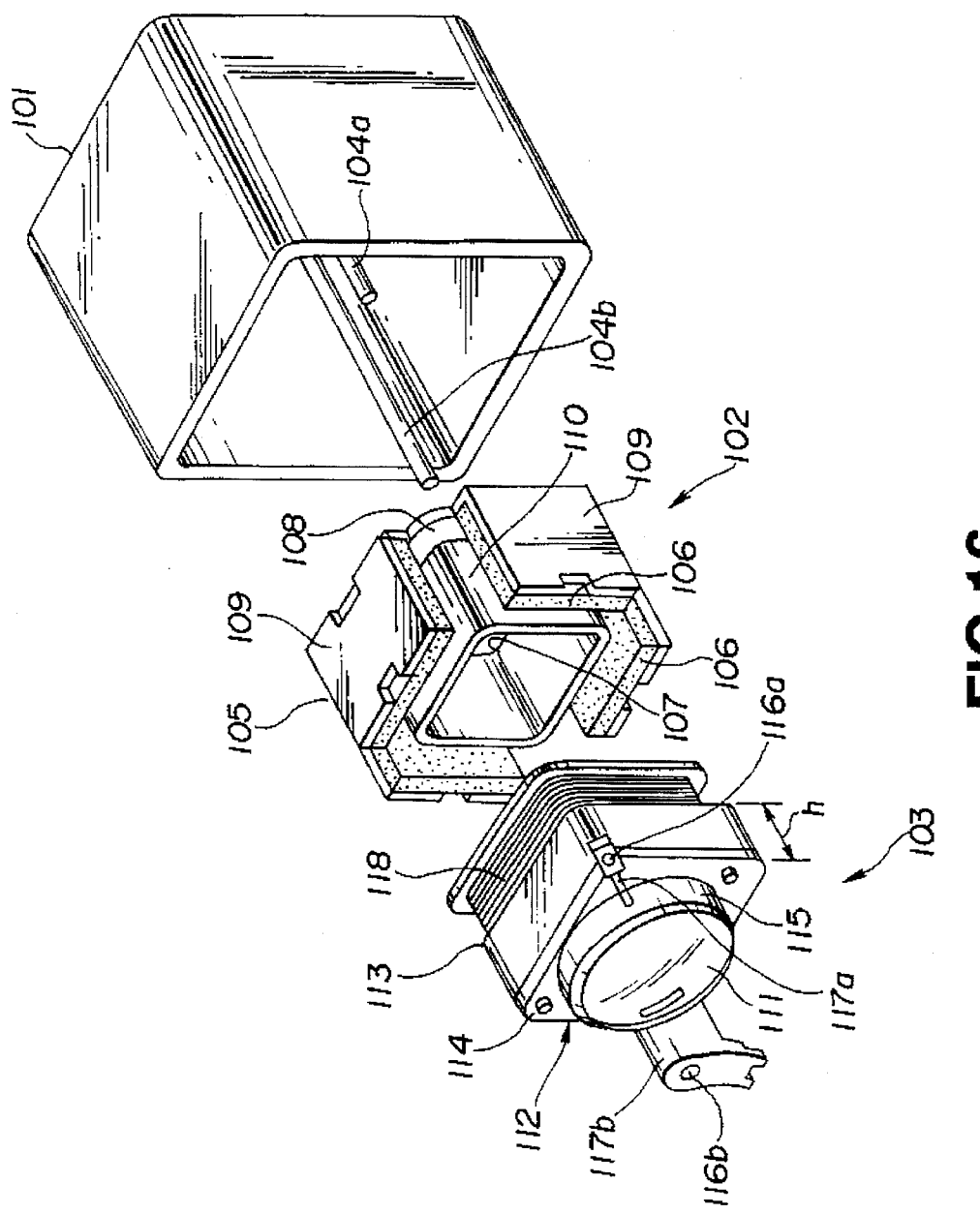
FIG. 16 is an exploded perspective view showing the focus control device according to the conventional example.

Accordingly, the thrust which affects to the movable member 3, as shown in FIG. 15(d), approximates to the combined component (shown in solid line D) of the proportional component of the density $\phi$ of the flux linkage in the positive direction applied to the A-phase coil C1 while the A-phase coil C1 becomes the circularized state in the positive direction (shown in solid line A1), the proportional component of the absolute value in the density $\phi$ of the flux linkage in the negative direction applied to the A-phase coil C1 while the A-phase coil C1 becomes the circularized state in the negative direction (shown in solid line A2), the proportional component of the density φ of the flux linkage in the positive direction applied to the B-phase coil C2 while the B-phase coil C2 becomes the circularized state in the positive direction (shown in broken line B1), the proportional component of the absolute value in the density φ of the flux linkage in the negative direction applied to the B-phase coil C2 while the B-phase coil C2 becomes the circularized state in the negative direction (shown in broken line B2), the proportional component of the density φ of the flux linkage in the positive direction applied to the C-phase coil C3 while the C-phase coil C3 becomes the circularized state in the positive direction (shown in one-dot chain line C1), the proportional component of the absolute value in the density φ of the flux linkage in the negative direction applied to the C-phase coil C3 while the C-phase coil C3 becomes the circularized state in the negative direction (shown in one-dot chain line C2), thereby substantially constant thrust is to be affected over the whole moving range of the movable member 3.

In the focus control device according to the third example, as in the focus control device according to the first example, restrictions in the moving range and decrease of the moving speed due to the wiring and the like to the movable member 3 are not caused with respect to the position detection of the movable member 3, and the movement of the movable member 3 can be made smoothly in response to the current supply to the coils, and the thrust applied to the movable member 3 can be made substantially constant over the whole moving range, thereby the movement of the movable member 3 becomes quite smooth, and the position detection of the movable, member 3 can be easily made.

Furthermore, since the magnet 9 for generating the thrust is multipolarly magnetized, it can be prevented to concentrate the magnetic flux from the magnet 9 on one or two spots, and the magnetic flux from said magnet 9 can be applied to the whole coils of more than two phases. As a result, even if the yoke thickness of the inside yoke 6 and the outside yoke 7 is made thinner, it can be possible to move the movable member 3 efficiently, and lightening of the focus control device per se can be realized.

Furthermore, the movable member 3 can be moved in a state that the focus lens 10 is housed in the fixed member 2, and the length of the device itself can be reduced substantially up to the length of the fixed member 2, thereby the down-sizing of the focus control device itself can be designed.

Furthermore, the movable member 3 can be moved in a state that the focus lens 10 is housed in the fixed member 2, and the length of the device itself can be reduced substantially up to the length of the fixed member 2, thereby the down-sizing of the focus control device itself can be designed.

In said first to third examples, the focus control device is applied to the drive control device of a movable lens (focus lens 10) in the inner focus unit mounted in the lens mirror cylinder such as a video camera and the like, but it can be applied to the whole moving device in which members other than the lens 10 are moved in an electromagnetic drive method (in a drive method by means of a voice coil motor).

Furthermore, in said examples, a magnet for detecting the position which is multipolarly magnetized is used as a body to be detected provided in the movable member, but a multilayer pattern of black and white or a slit pattern may be formed. In that case, as a position-detecting means provided in the fixed member, a photoreflector may be used with respect to said multilayer pattern of black and white, and a photo-interpreter may be used with respect to the slit pattern.

As described above, according to the electromagnetic driving device of the present invention, since it has a fixed member having an outside yoke and an inside yoke, a magnet for generating the thrust being bonded on either side of these outside yoke or inside yoke, and a movable member having a body to be driven-holding portion for holding a body to be driven, and a coil wound in more than two phases in an axial direction between said outside yoke and inside yoke, and is movable in an axial direction with respect to the fixed member, in which a body to be detected for detecting the position is provided in said movable member, and a position-detecting means is provided in said fixed member which detects the magnetic field of said magnet and detects the position of the movable member to generate a position-detecting signal for controlling the current supply to the coil, any restrictions of the moving range and any decrease in the moving speed due to wiring and the like of the movable member are not caused, and smooth movements according to the current supply to the coil can be provided, with respect to the position detection of the movable member.

Furthermore, according to the electromagnetic driving device of the present invention, in said electromagnetic driving device, the magnet for generating the thrust is multipolarly magnetized, thereby it can be prevented to concentrate the magnetic flux from the magnet on one or two spots, to apply the magnetic flux from said magnet to the whole coils of more than two phases, and it is attained to move the movable member 3 efficiently, and to make the yoke thickness thin to realize the lightening of the focus control device per se.

Furthermore, according to the electromagnetic driving device of the present invention, in said electromagnetic driving device, the magnetized width of the end portion of the magnet for generating the thrust multipolarly magnetized is made to be 0.5 to 0.7 times as long as that of the central portion, thereby the thrust applied to the movable member can be made uniform over the whole moving range to make the position control of the movable member easy.

Furthermore, according to the electromagnetic driving device of the present invention, in said electromagnetic driving device, said fixed member is fixed to the outer housing having an axis, an axis-receiving portion into which said axis is inserted being provided in said movable member, said axis-receiving portion being provided in said movable member so that it is projected outward than said outside yoke in said fixed member, a notch being provided to a position corresponding to at least said axis-receiving portion of said outside yoke and said inside yoke, and the penetrating portion of said inside yoke being formed in the forward portion of said movable member, thereby the movable member can be moved in a state that the body to be driven is housed in the movable member and the length of the device itself can be reduced substantially up to the length of the fixed member, thereby the down-sizing of the focus control device itself can be designed.

What is claimed is:

1. An electromagnetic driving device which comprises a fixed member having an outside yoke and an inside yoke, a magnet for generating a thrust being fixed on either side of the outside yoke or the inside yoke, and a movable member which has a driven holding body portion for holding a body to be driven and a coil wound in at least two phases in the axial direction between the outside yoke and the inside yoke, and which movable member is movable in the axial direction with respect to the fixed member, wherein a body to be detected is provided in said movable member, and a position-detecting means provided in said fixed member which detects the body to be detected in order to determine the position of the movable member in order to generate a position-detecting signal for controlling the current supply to the coil.

2. An electromagnetic driving device according to claim 1, wherein said magnet for generating the thrust is multipolarly magnetized, and the magnetized width of the end portions is 0.5 to 0.7 times as long as that of the central portion.

3. An electromagnetic driving device according to claim 1 or 2, wherein said body to be detected is a second magnet multipolarly magnetized with an equal interval, and said position-detecting means is a Hall element provided opposite to the second magnet.

4. An electromagnetic driving device according to claim 3, wherein said fixed member has an axis fixed to an outer housing and said movable member has an axis-receiving portion to which an axis is penetrated, said axis-receiving portion being provided in said movable member so that it projects outward than said outside yoke in said fixed member, a notch being provided in a position corresponding to at least said axis-receiving portion of said outside yoke and said inside yoke, and a penetrating portion of said inside yoke being formed in a forward portion of said movable member.

5. An electromagnetic driving device according to claim 3, wherein said body to be driven is a lens, and said driven holding body portion is a lens holder for holding said lens.

6. An electromagnetic driving device according to claim 3, wherein when the magnetized width of other than the end portions of said magnet for generating the thrust is assumed to be $\lambda$, an alienated width of the center in the winding direction of each phase in said coil wound in two phases is $\lambda/2+n\lambda$ (n is an integer), an alienated width of two Hall elements which constitute said position-detecting means is $\lambda/2+n\lambda$ (n is an integer), and when the center in the winding direction of one phase of the coil is located in the magnetized boundary of said magnet for generating the thrust, one Hall element of said two Hall elements is provided in a position located in the magnetized boundary of the second magnet.

7. An electromagnetic driving device according to claim 6, wherein said fixed member has an axis fixed to an outer housing and said movable member has an axis-receiving portion to which an axis is penetrated, said axis-receiving portion being provided in said movable member so that it projects outward than said outside yoke in said fixed member, a notch being provided in a position corresponding to at least said axis-receiving portion of said outside yoke and said inside yoke, and a penetrating portion of said inside yoke being formed in a forward portion of said movable member.

8. An electromagnetic driving device according to claim 6, wherein said body to be driven is a lens, and said driven holding body portion is a lens holder for holding said lens.

9. An electromagnetic driving device according to claim 6, wherein said fixed member has an axis fixed to an outer housing and said movable member has an axis-receiving portion to which an axis is penetrated, said axis-receiving portion being provided in said movable member so that it projects outward than said outside yoke in said fixed member, a notch being provided in a position corresponding to at least said axis-receiving portion of said outside yoke and said inside yoke, and a penetrating portion of said inside yoke being formed in a forward portion of said movable member.

10. An electromagnetic driving device according to claim 3, wherein the width in one magnetized direction differs from the width of the other magnetized direction other than the end portions in said magnet for generating the thrust, and the average of the width in one magnetized direction and the width of the other magnetized direction is $\lambda$, an alienated width of the center in the winding direction of each phase in said coil wound in two phases is $n\lambda$ (n is an integer), and when the center in the winding direction of one phase of the coil is located in a position alienated by $\lambda/2+n\lambda$, said Hall element is provided in a position located in the magnetized boundary of said second magnet.

11. An electromagnetic driving device according to claim 10, wherein said body to be driven is a lens, and said driven holding body portion is a lens holder for holding said lens.

12. An electromagnetic driving device according to claim 3, wherein when the magnetized width of other than the end portions of said magnet for generating the thrust is assumed to be $\lambda$, an alienated width of the center in the winding direction of each phase in said coil wound in three phases is $2\lambda/3+n\lambda$ (n is an integer), and an alienated width of three Hall elements which constitute said position-detecting means is $2\lambda/3+n\lambda$ (n is an integer).

13. An electromagnetic driving device according to claim 12, wherein said fixed member has an axis fixed to an outer housing and said movable member has an axis-receiving portion to which an axis is penetrated, said axis-receiving portion being provided in said movable member so that it projects outward than said outside yoke in said fixed member, a notch being provided in a position corresponding to at least said axis-receiving portion of said outside yoke and said inside yoke, and a penetrating portion of said inside yoke being formed in a forward portion of said movable member.

14. An electromagnetic driving device according to claim 12, wherein said body to be driven is a lens, and said driven holdinq body portion is a lens holder for holding said lens.

15. An electromagnetic driving device according to either one of claims 1 to 2, wherein said fixed member has an axis fixed to an outer housing and said movable member has an axis-receiving portion to which an axis is penetrated, said axis-receiving portion being provided in said movable member so that it projects outward than said outside yoke in said fixed member, a notch being provided in a position corresponding to at least said axis-receiving portion of said outside yoke and said inside yoke, and a penetrating portion of said inside yoke being formed in an forward portion of said movable member.

16. An electromagnetic driving device according to claim 15, wherein said body to be driven is a lens, and said driven holding body portion is a lens holder for holding said lens.

17. An electromagnetic driving device according to either one of claims 1 to 2, wherein said body to be driven is a lens, and said driven holding body portion is a lens holder for holding said lens.

* * * * *